(12) United States Patent
Emmi et al.

(10) Patent No.: US 7,673,585 B1
(45) Date of Patent: Mar. 9, 2010

(54) DECORATIVE CAT LITTER BOX ENCLOSURE

(76) Inventors: AnnMarie Emmi, 4 Hampton Rd., Massapequa, NY (US) 11758; Joseph Emmi, Jr., 4 Hampton Rd., Massapequa, NY (US) 11758

( * ) Notice: Subject to any disclaimer, the term of this patent is extended or adjusted under 35 U.S.C. 154(b) by 494 days.

(21) Appl. No.: 11/680,757

(22) Filed: Mar. 1, 2007

(51) Int. Cl.
*A01K 29/00* (2006.01)
(52) U.S. Cl. .................. 119/168; 119/165; 119/170
(58) Field of Classification Search .............. 119/161, 119/165, 168, 170, 442, 462, 479
See application file for complete search history.

(56) References Cited

U.S. PATENT DOCUMENTS

| | | | | |
|---|---|---|---|---|
| 3,618,568 | A * | 11/1971 | Breeden | 119/482 |
| 4,299,190 | A * | 11/1981 | Rhodes | 119/170 |
| 4,760,816 | A * | 8/1988 | Rhodes | 119/165 |
| 5,092,270 | A * | 3/1992 | Simons et al. | 119/453 |
| 5,148,768 | A * | 9/1992 | Hinton | 119/500 |
| 5,195,457 | A * | 3/1993 | Namanny | 119/484 |
| 5,394,835 | A * | 3/1995 | Gatta | 119/170 |
| D388,912 | S * | 1/1998 | Hurst et al. | D30/161 |
| 5,842,438 | A * | 12/1998 | Messmer | 119/165 |
| 7,481,182 | B2 * | 1/2009 | Simpson et al. | 119/168 |
| 2006/0196439 | A1 * | 9/2006 | Chilcoat | 119/165 |

* cited by examiner

*Primary Examiner*—Michael R Mansen
*Assistant Examiner*—Monica L Williams
(74) *Attorney, Agent, or Firm*—Michael I Kroll

(57) ABSTRACT

A decorative cat litter box enclosure having a furniture like appearance with a pivotal ramp having a lip on three side and a mesh-like material extending between the sides so that when the ramp is closed the interior ramp edge arcs over the litter box depositing any captive litter from the cat's paws back into the litter box. Also provided is a based positioned hinged door to access the litter box which has a plastic liner and drawstring that work in conjunction with an extendable retractable latch located on the exterior front that when extended prevents removal of the litter box while the drawstring is used to close the plastic liner bag. The latch is then retracted and the litter bag is removed for disposal. Also provided on the exterior surface are a plurality of hooks for attaching accessory items as desired by the user which may include dust pan, brush and rubber gloves along with attachable removable food and water dishes. Other decorative elements may be included such as interior scenic landscapes in bright colors and a plant placed on the exterior top of the housing.

27 Claims, 24 Drawing Sheets

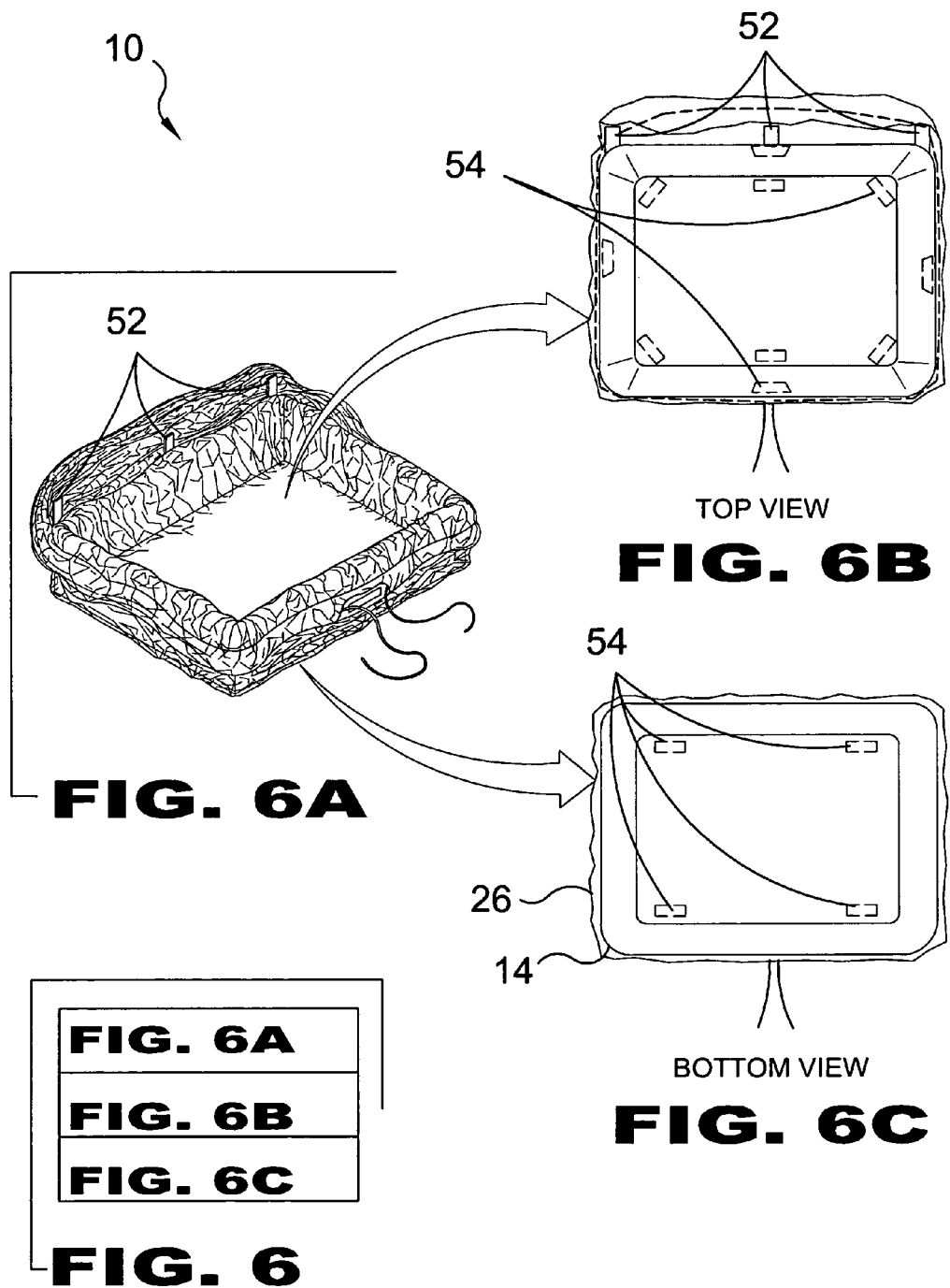

STEP 1
(LIFT RAMP FOR ACCESS TO LITTER BAG)

STEP 2
(ENGAGING SLIDING STOP)

STEP 3
(PULL DRAW STRING TO CLOSE LITTER BAG)

STEP 4
(PULL LITTER BAG BY STRING FOR REMOVAL)

STEP 5
(REMOVE LITTER UNIT TO INSERT NEW LITTER UNIT)

STEP 6
(REPLACING WITH NEW LITTER BAG AND TRAY UNIT)

STEP 2
(ENGAGING SLIDING STOP)

STEP 3
(PULL DRAW STRING TO CLOSE LITTER BAG)

STEP 4
(WITH STOP IN THE UP POSITION PULL LITTER BAG BY STRING FOR REMOVAL)

STEP 5
(REMOVE LITTER BOX TO INSERT NEW LITTER BAG)

STEP 6
(REPLACING WITH NEW LITTER BAG)

DECORATIVE CAT LITTER BOX ENCLOSURE

BACKGROUND OF THE INVENTION

1. Field of the Invention

The present invention relates generally to receptacles and, more specifically, to a decorative housing for a cat litter box having a furniture like appearance.

The housing has an offset pivotal ramp with a lip on three side and a mesh-like material extending between the sides so that when the ramp is closed the interior ramp edge arcs over the litter box depositing any captive litter from the cat's paws back into the litter box.

At the base of the housing is a hinged door providing access to the litter box which has a plastic liner and drawstring that works in conjunction with an extendable retractable latch on the exterior front that when extended prevents removal of the litter box while the drawstring is used to close the plastic liner bag. The latch is then retracted and the litter bag is removed for disposal.

Also provided on the exterior surface are a plurality of hooks for attaching accessory items as desired by the user which may include dust pan, brush and rubber gloves along with attachable removable food and water dishes.

Other decorative elements may be included such as interior scenic landscapes in bright colors and a plant placed on the exterior top of the housing.

2. Description of the Prior Art

There are other enclosure device designed for pet litter boxes. While these enclosures may be suitable for the purposes for which they were designed, they would not be as suitable for the purposes of the present invention, as hereinafter described.

It is thus desirable to provide a litter box enclosure having a furniture like appearance. It is further desirable to provide a litter box enclosure having an offset pivotal ramp that can be lowered to provide access to the litter box and closed to provide concealment of the litter box as well as capturing lose litter from the cat's paws and depositing it back into the litter box.

SUMMARY OF THE PRESENT INVENTION

A primary object of the present invention is to provide an enclosure for a cat litter box.

Another object of the present invention is to provide a cat litter box enclosure having a furniture like appearance.

Yet another object of the present invention is to provide a cat litter box enclosure having a pivotal ramp providing access to the interiorly positioned cat litter box.

Still yet another object of the present invention is to provide a cat litter box enclosure wherein said ramp has an interior surface covered by mesh-like material suspended on a periphery lip along three side to capture litter from the cat's paws upon departure.

Another object of the present invention is to provide a cat litter box enclosure wherein said ramp when pivoted closed deposits the captive litter back into the litter box.

Yet another object of the present invention is to provide a cat litter box enclosure having a base positioned door for inserting and removing the cat litter box.

Still yet another object of the present invention is to provide a cat litter box enclosure having a litter box with a plastic liner bag and draw string for selectively sealing the soiled litter within said bag for disposal.

Another object of the present invention is to provide a cat litter box enclosure having an extendable retractable latch to prevent removal of the litter box while the plastic liner bag is closed via the drawstring for disposal Yet another object of the present invention is to provide a cat litter box enclosure having a plurality of exteriorly positioned hooks for attachment of accessory items.

Still yet another object of the present invention is to provide a cat litter box enclosure having exterior hook-like fasteners for attachment of food and water dishes.

Additional objects of the present invention will appear as the description proceeds.

The present invention overcomes the shortcomings of the prior art by providing a decorative cat litter box enclosure having a furniture like appearance with a pivotal ramp having a lip on three side and a mesh-like material extending between the sides so that when the ramp is closed the interior ramp edge arcs over the litter box depositing any captive litter from the cat's paws back into the litter box. Also provided is a based positioned hinged door to access the litter box which has a plastic liner and drawstring that work in conjunction with an extendable retractable latch located on the exterior front that when extended prevents removal of the litter box while the drawstring is used to close the plastic liner bag. The latch is then retracted and the litter bag is removed for disposal. Also provided on the exterior surface are a plurality of hooks for attaching accessory items as desired by the user which may include dust pan, brush and rubber gloves along with attachable removable food and water dishes. Other decorative elements may be included such as interior scenic landscapes in bright colors and a plant placed on the exterior top of the housing.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is an illustrative view of the present invention in use;
FIG. 2 is a perspective view of the present invention;
FIG. 3 is a perspective view of the present invention;
FIG. 4 is an illustrated chart of the present invention;
FIG. 5 is an illustrated chart of the present invention;
FIG. 6 is the attachment locations of the present invention.
FIG. 7 is a perspective view of the present invention;
FIG. 8 is a perspective view of the present invention;
FIG. 9 is a perspective view of the present invention;
FIG. 10 is a perspective view of the present invention;
FIG. 11 is a perspective view of the present invention;
FIG. 12 is a perspective view of the present invention;

DESCRIPTION OF THE REFERENCED NUMERALS

Figure 1:
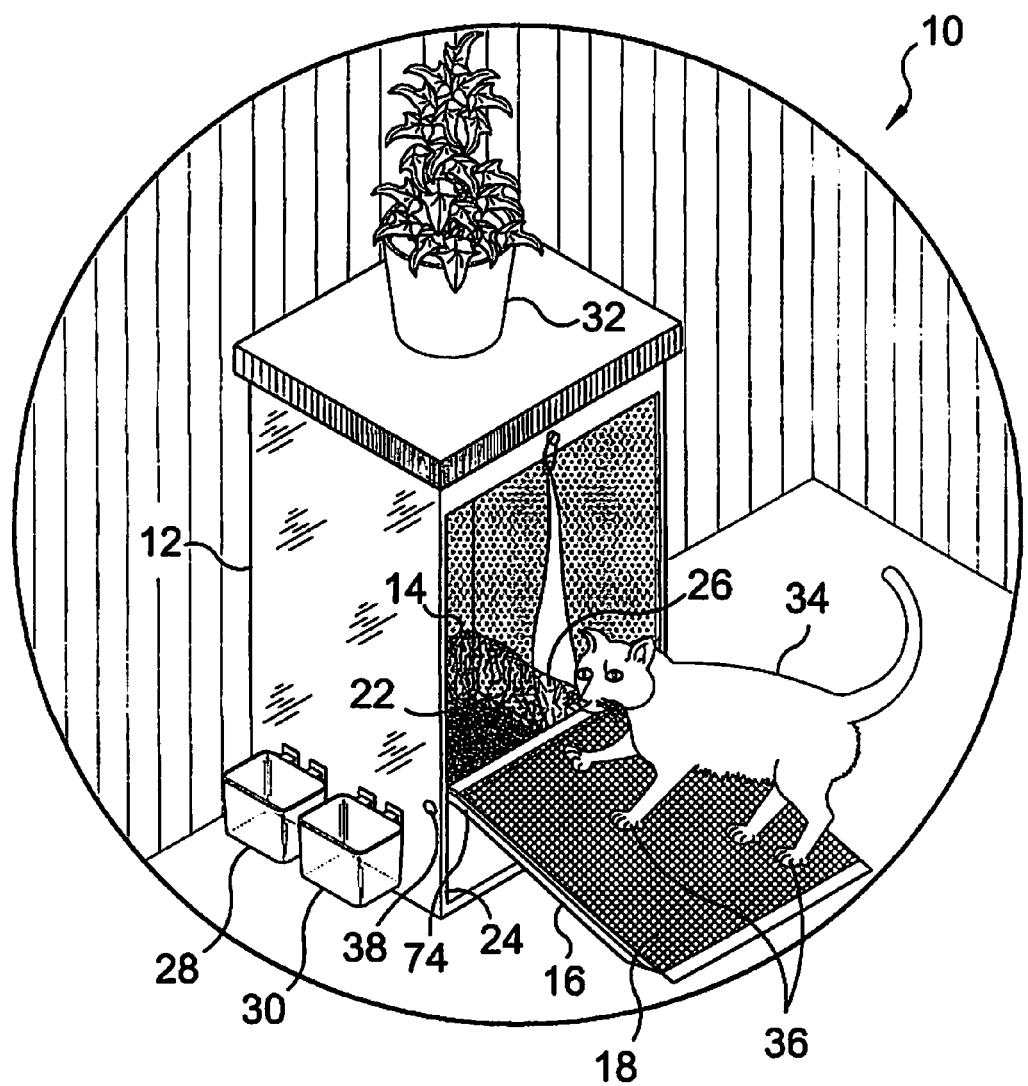

Turning now descriptively to the drawings, in which similar reference characters denote similar elements throughout the several views, the figures illustrate the Decorative Litter Box Enclosure of the present invention. With regard to the reference numerals used, the following numbering is used throughout the various drawing figures.

10 Decorative Litter Box Enclosure of the present invention
12 housing
14 litter box
16 pivoting ramp
18 mesh screen of 16
22 cat litter
24 base of 12
26 liner of 16
28 food dish
30 water dish
32 plant
34 cat
36 cat paw
38 hinge of 16
40 access hook
42 dust pan and brush
44 disposable glove bag
46 curtain
48 rubber edge of 16
50 drawstring of 26
52 support tab of 14
54 attachment positions
56 litter box access door
58 stop assembly
60 sliding stop
62 stop retainer
64 stop aperture of 56
66 stop catch
68 catch hook
70 ramp closure latch mechanism
72 user
74 catch tray
78 attachment notch
80 interior wall of 12
82 decorative illustration

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a decorative housing 12 for a cat litter box 14 having a furniture like appearance. The housing 12 has an offset pivotal ramp 16 with a lip on three sides and a mesh cover 18 extending between the sides so that when the ramp 16 is closed the interior ramp 16 edge forms an catch tray 74 arcs over the litter box 14 depositing any captive litter 22 from the cat's 34 paws back into the litter box 14. The ramp 16 is hingedly connected to the base 24 of the housing 12 forming a hinged 36 door providing access to the litter box 14 which has a plastic liner 26 and drawstring that works in conjunction with an extendable retractable latch on the exterior front that when extended prevents removal of the litter box 14 while the drawstring is used to close the plastic liner bag 26. The latch is then retracted and the litter bag 26 is removed for disposal. Also provided on the exterior surface are a plurality of hooks for attaching accessory items as desired by the user which may include dust pan, brush and rubber gloves along with attachable removable food 28 and water 30 dishes. Other decorative elements may be included such as interior scenic landscapes in bright colors and a plant 32 placed on the exterior top of the housing.

Figure 2:
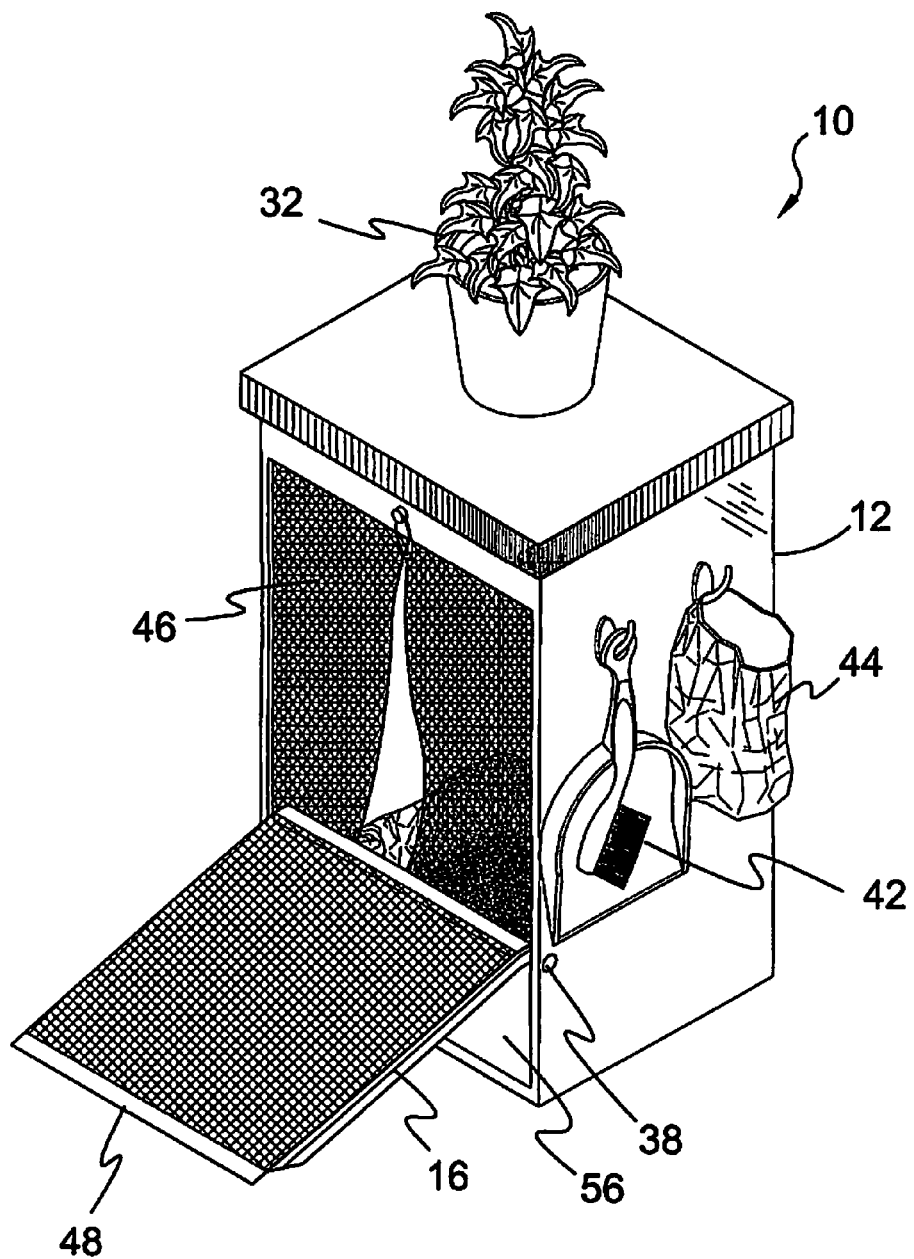

FIG. 2 is a perspective view of the present invention 10. Shown is the kitty litter box housing 12 with the pivoting ramp 16 in a down position. The ramp 16 has a rubber edge 48 to protect the floor surface. The hinged 38 ramp 16 allows the cat access to the interior of the housing 12 which provides a litter box 14. Beneath the ramp 16 is a litter box access door 56. Also shown is a dust pan with sweep brush 42 and plastic glove bag 44 removably attached to the side wall by accessory hooks 40. A curtain 46 hangs at the access opening allowing cat privacy and a blocked view from the outside. A plant 32 or other item (s) may adorn the top of the housing 12.

Figure 3:
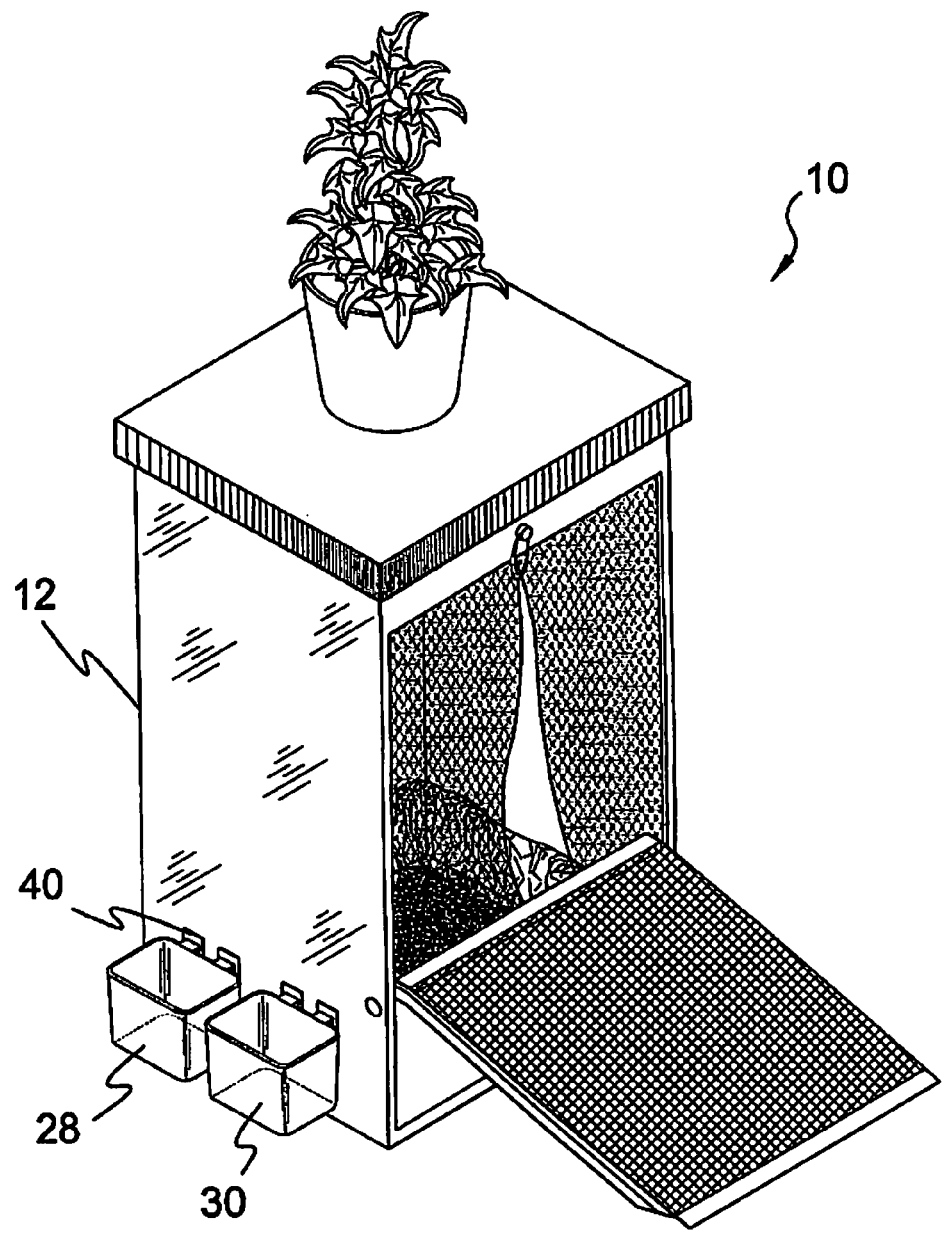

FIG. 3 is a perspective view of the present invention 10. Shown are the food 28 and water 30 dishes removably attached to the external wall of the housing 12. The dishes 28,30 hook onto fasteners 40 attached to the side wall of the housing 12 and can be removed for cleaning or filling.

Figure 4:
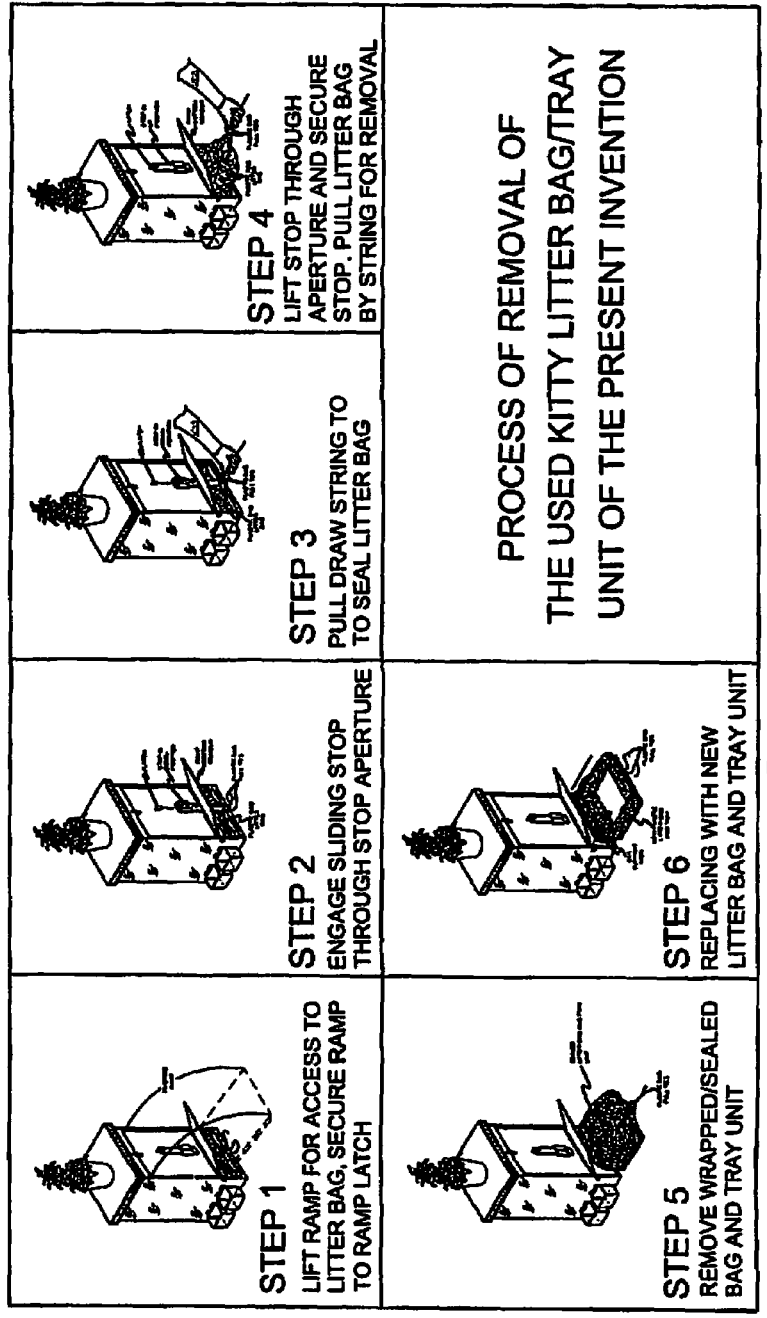

FIG. 4 is an illustrated chart of the present invention 10. Shown is a chart demonstrating the steps of closing, removing and replacing the kitty litter bag of the present invention 10. Each step will be addressed and described in detail in FIGS. 7-12.

Figure 5:
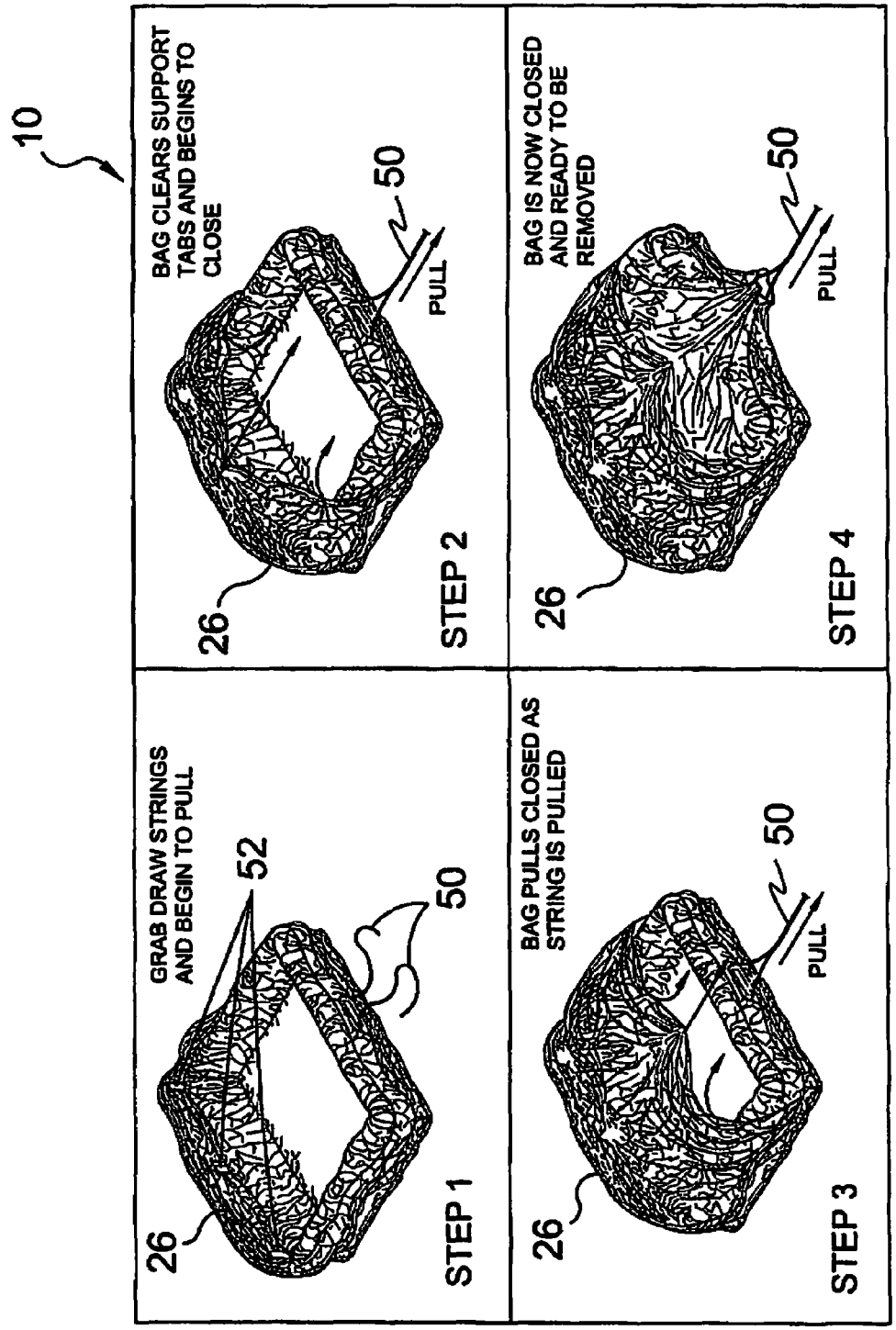

FIG. 5 is an illustrated chart of the present invention 10. Shown is a chart of the closing of the liner bag 26. The liner bag 26 has a drawstring 50 extending through the top perimeter thereof with the two ends exiting through the front portion. The rear portion of the liner 26 is retained in place during use by a plurality of support tabs 52 projecting from the rear of the litter box 14. For removal, the user grabs and pulls on the drawstring 50 ends and the liner 26 clears the support tabs 52 and continues to close as the drawstrings 50 are pulled.

FIG. 6 is perspective, top and bottom view of the attachment locations 54 of the present invention 10. Shown are the support tabs 52 and attachment positions 54 that secure the liner 26 to the tray.

Figures 7, 7A, 7B:
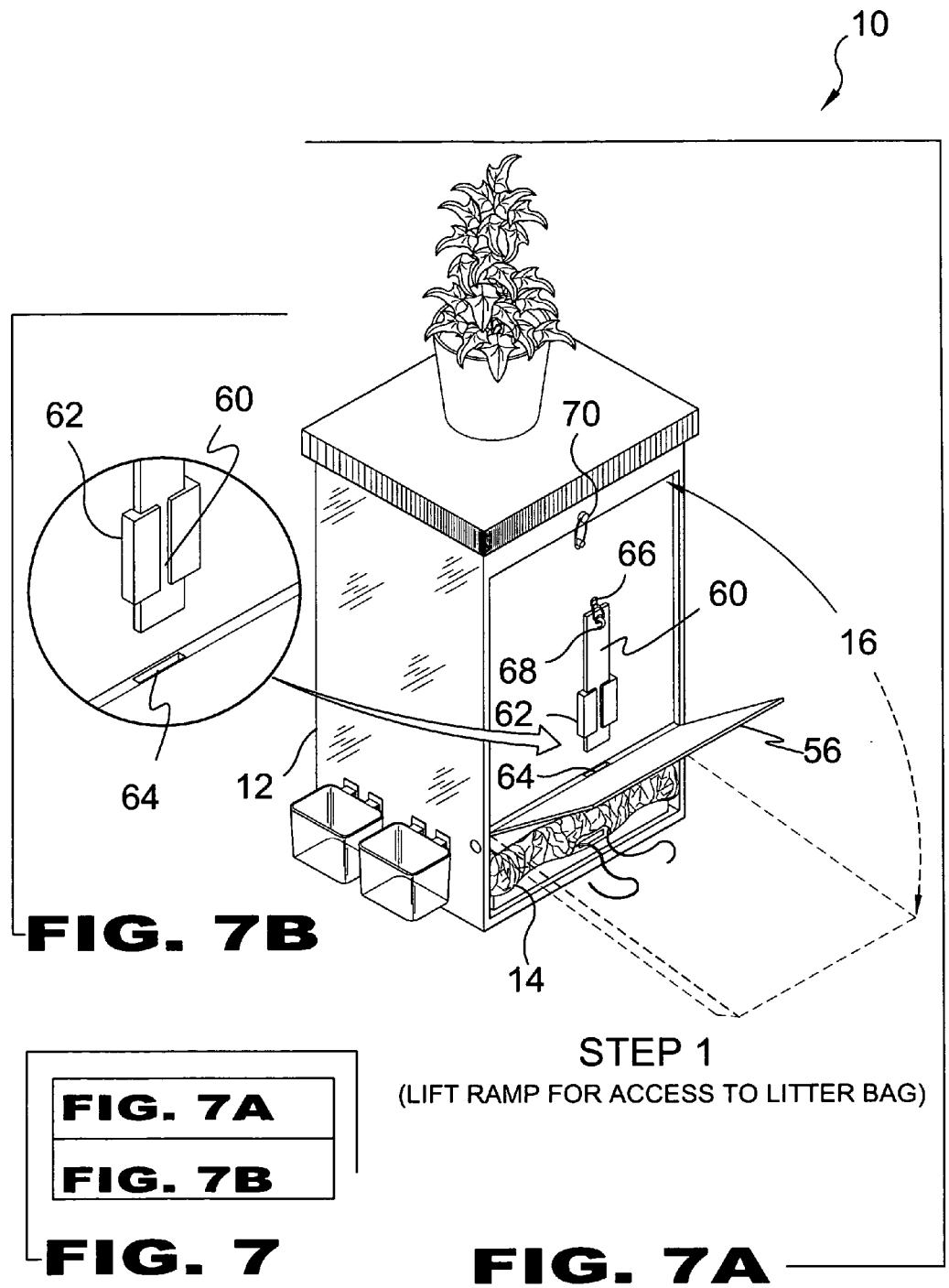

FIG. 7 is a perspective view of the present invention 10. Shown is the first step for changing the litter as shown in FIG. 4 showing the housing 12 with the pivoting ramp 16 secured in the up position by a closure latch 70 having mating members on the ramp 16 and the housing 12. A stop assembly 58 is included on the bottom of the ramp 16 when in the open position and is revealed when in the closed position. The stop assembly 58 comprises a sliding stop member 60 that slides vertically within a stop retainer 62, a stop catch 66 disposed on the housing 12 that is attached to a catch hook 68 and a stop aperture 64 in the litter box 14 access door 64 that is aligned with the stop aperture 64 when the access door 64 is opened.

Figure 8:
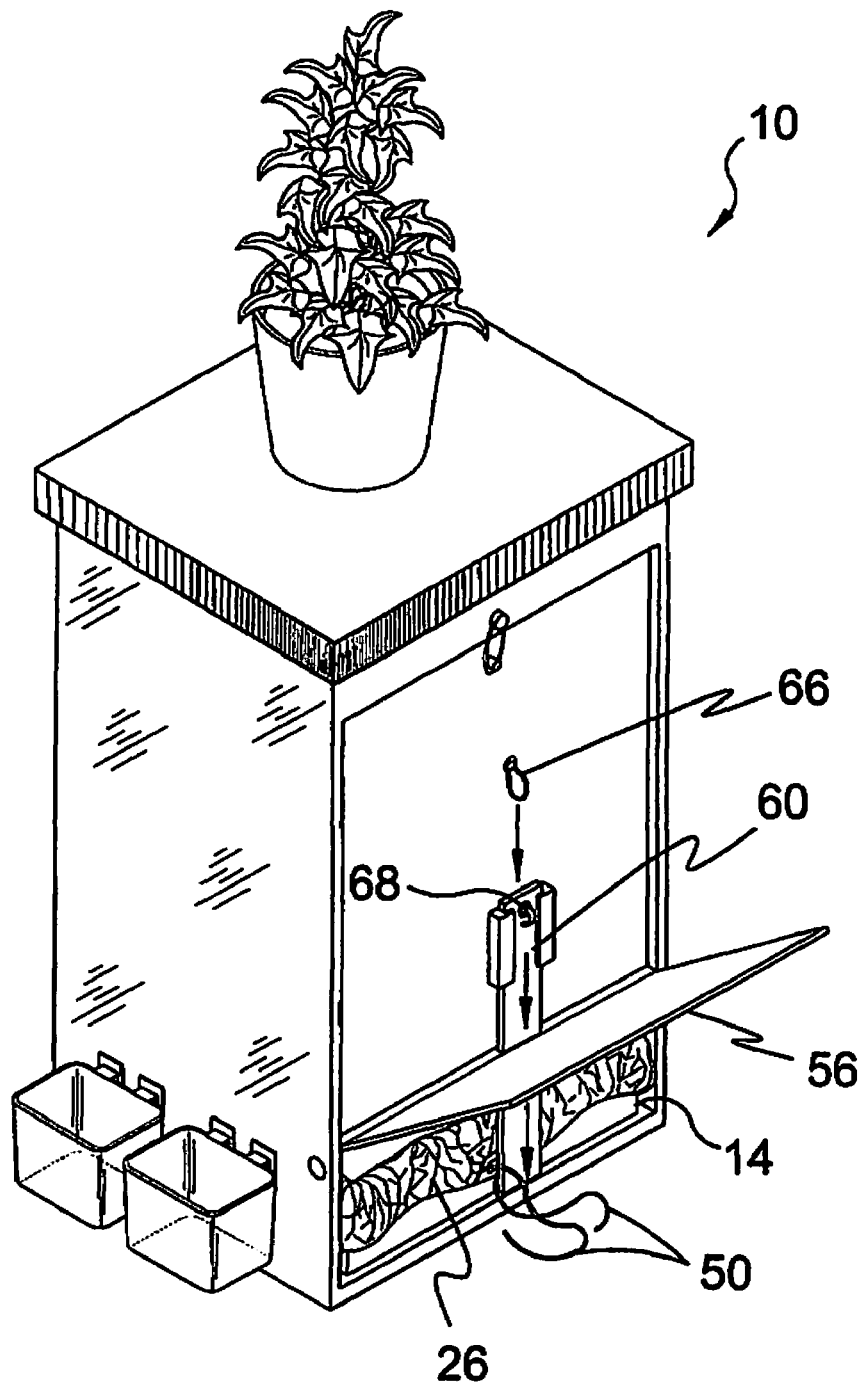

FIG. 8 is a perspective view of the present invention 10. Shown is the access door 56 in the up position, the stop catch 66 is released from the catch hook 68 and the sliding stop 60 is extended down through the stop aperture 64, preventing the litter box 14 from moving while the draw string 50 closes the liner 26.

Figure 9:
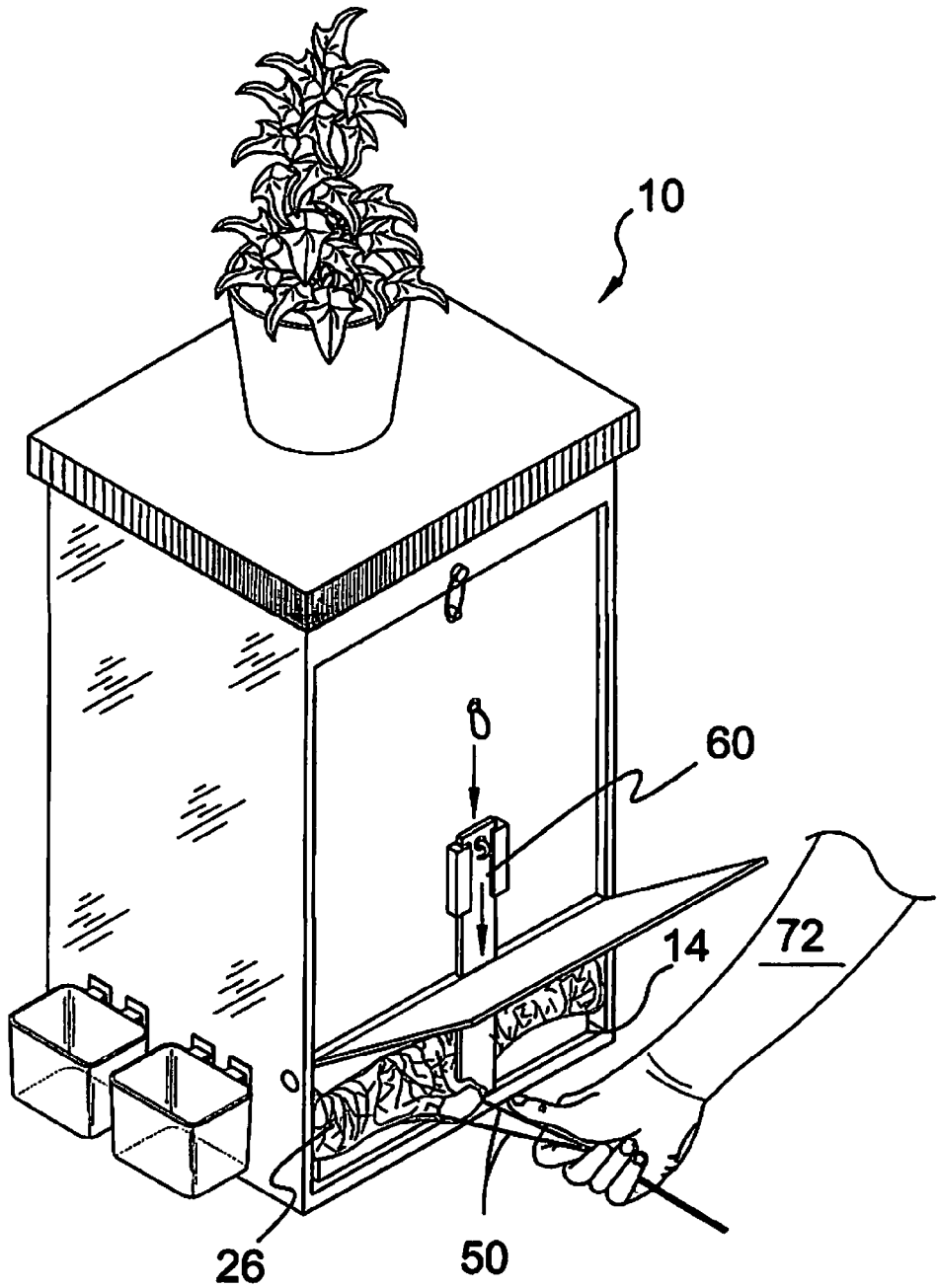

FIG. 9 is a perspective view of the present invention 10. Shown is the sliding stop 60 in the down position preventing the litter box 14 from moving while the draw string 50 is pulled by the user 72 closing the kitty litter bag 26.

Figure 10:
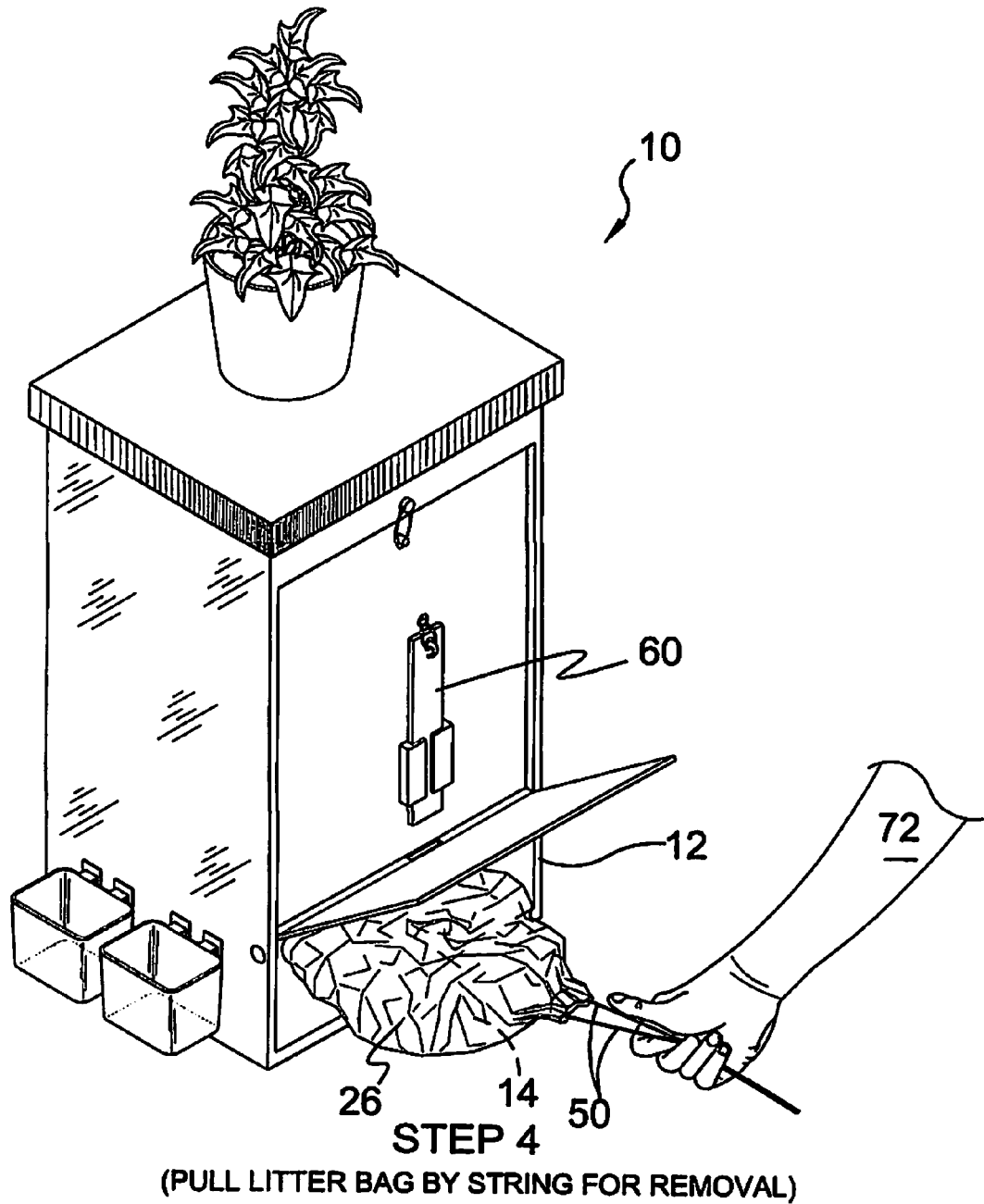

FIG. 10 is a perspective view of the present invention 10. Shown is the sliding stop 60 secured in the up position thereby removing the obstruction for removing the liner 26 with the litter box 14 and litter therein. Shown is the user 72 pulling on the drawstrings 50 with the liner 26 and contents partially removed from the housing 12.

Figure 11:
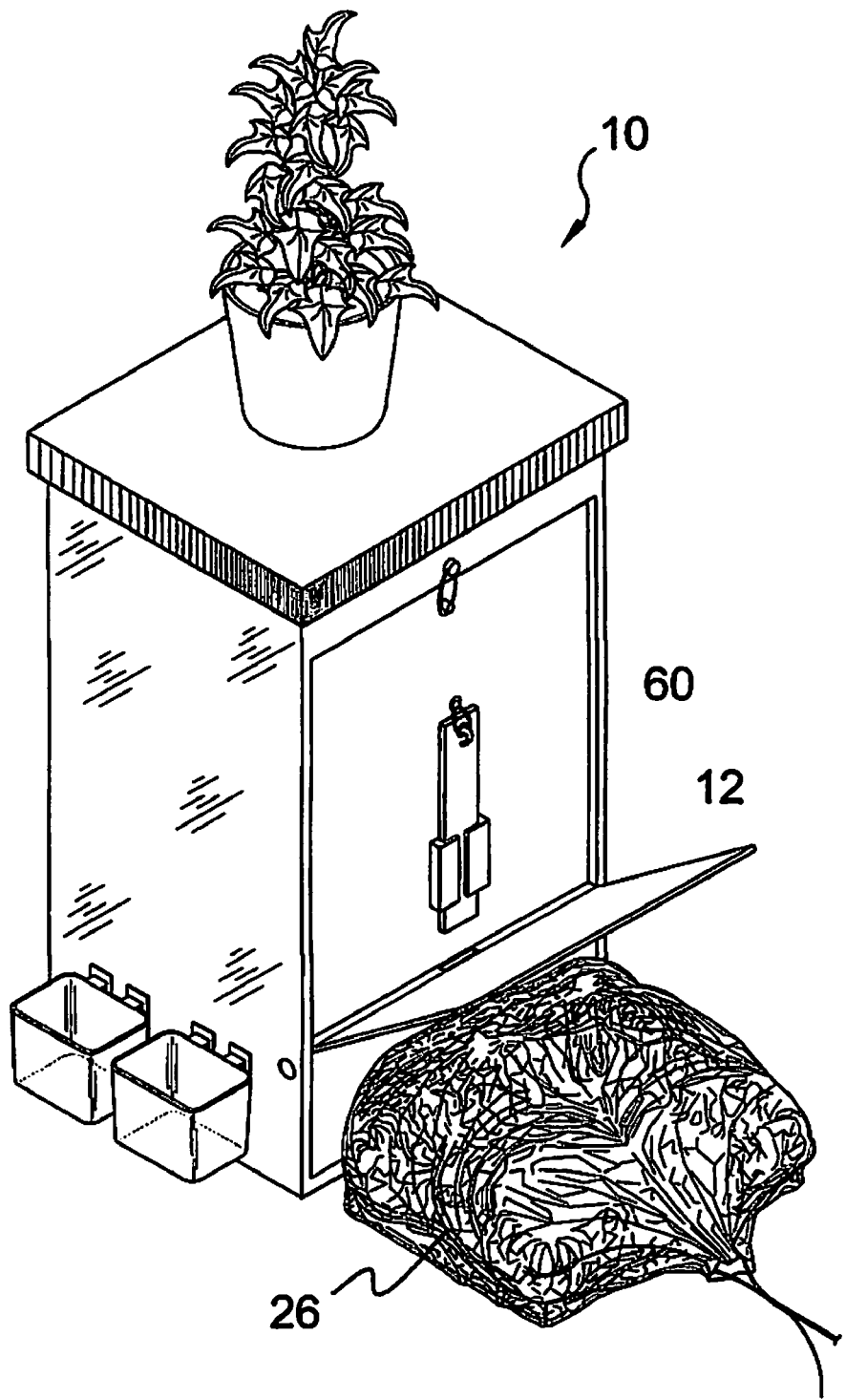

FIG. 11 is a perspective view of the present invention 10. Shown is the sliding stop 60 secured in the up position and the liner 26 containing the litter tray fully removed from the interior of the housing 12.

Figure 12:
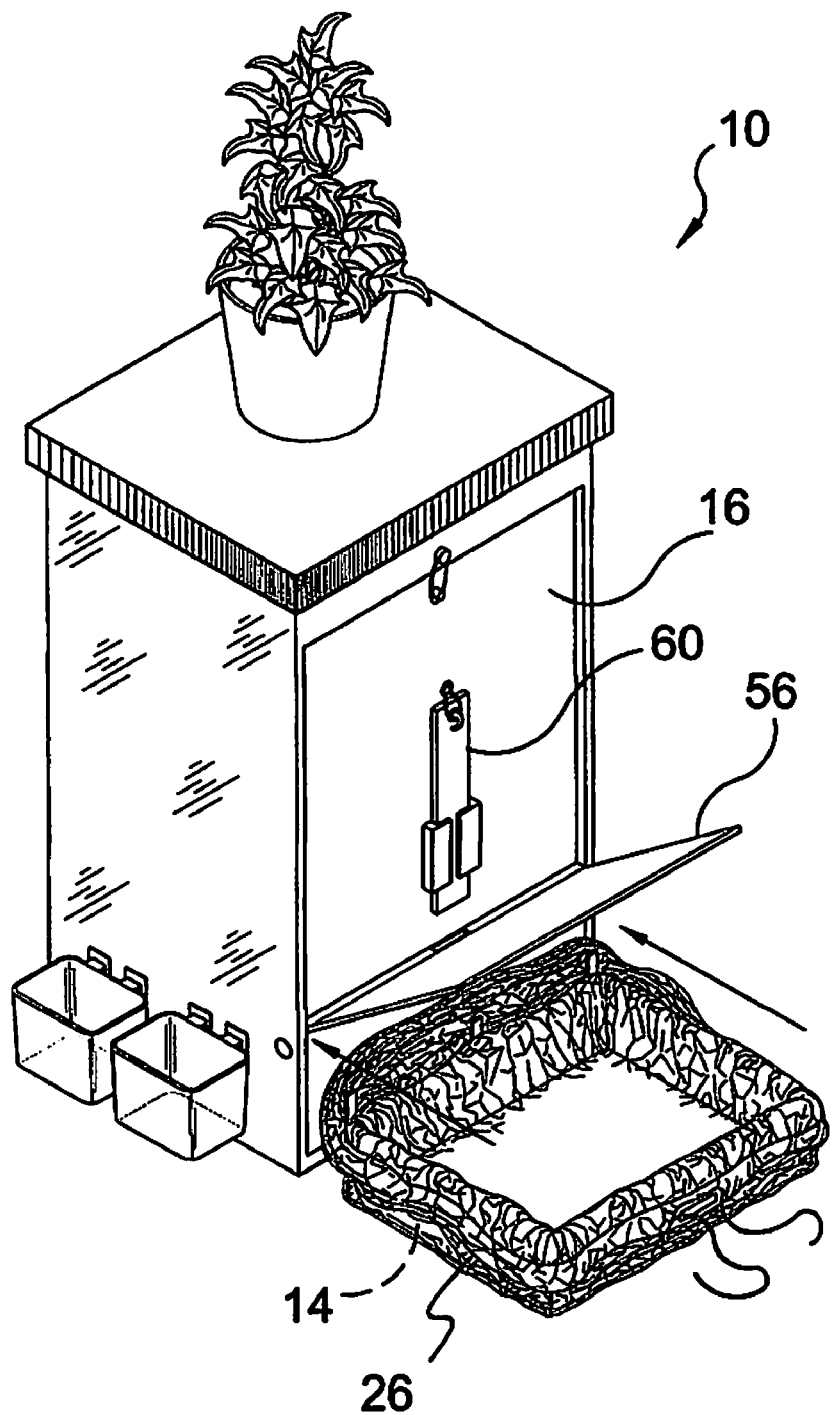

FIG. 12 is a perspective view of the present invention 10. Shown is the new litter tray 14 and liner 26 ready for cat litter 22 to be poured into. The tray 14 may then be inserted back within the housing 12 and the access door 56 and ramp 16 lowered for the cat's use.

Figure 13:
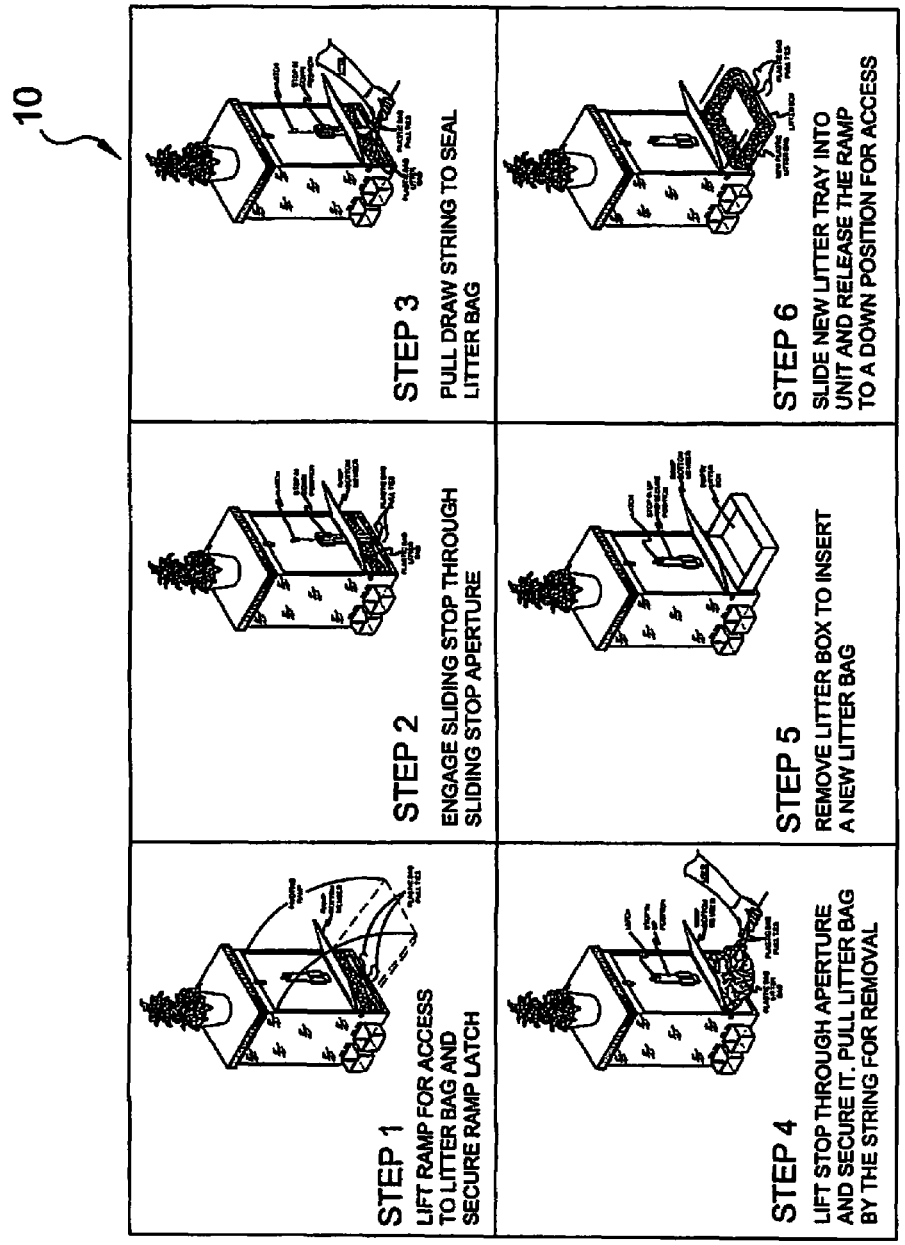
FIG. 13 is an illustrative chart of an additional embodiment of the present invention.

FIG. 13 is an illustrative chart of an additional embodiment of the present invention 10. Shown is a chart of the steps required in the closing and removal of the kitty litter bag of the present invention 10. This variation of the present invention 10 involves a litter box that is reusable and only the liner and litter are replaced. These steps are illustrated and described in greater detail in FIGS. 14-19.

Figure 14:
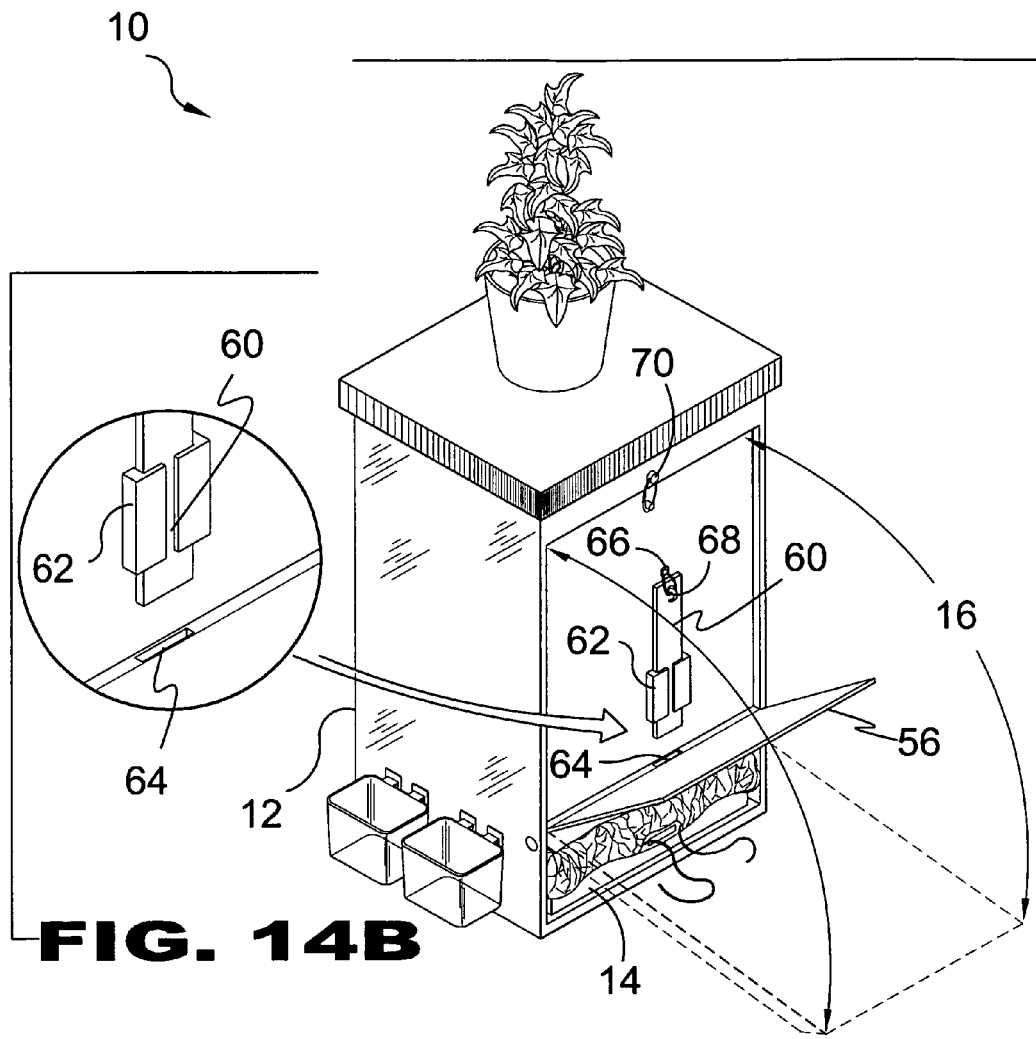
FIG. 14 is a perspective view of an additional embodiment of the present invention.

FIG. 14 is a perspective view of an additional embodiment of the present invention 10. Shown is the first step for changing the litter as shown in FIG. 4 showing the housing 12 with the pivoting ramp 16 secured in the up position by a closure latch 70 having mating members on the ramp 16 and the housing 12. A stop assembly 58 is included on the bottom of the ramp 16 when in the open position and is revealed when in the closed position. The stop assembly 58 comprises a sliding stop member 60 that slides vertically within a stop retainer 62, a stop catch 66 disposed on the housing 12 that is attached to a catch hook 68 and a stop aperture 64 in the litter box 14 access door 64 that is aligned with the stop aperture 64 when the access door 64 is opened.

Figure 15:
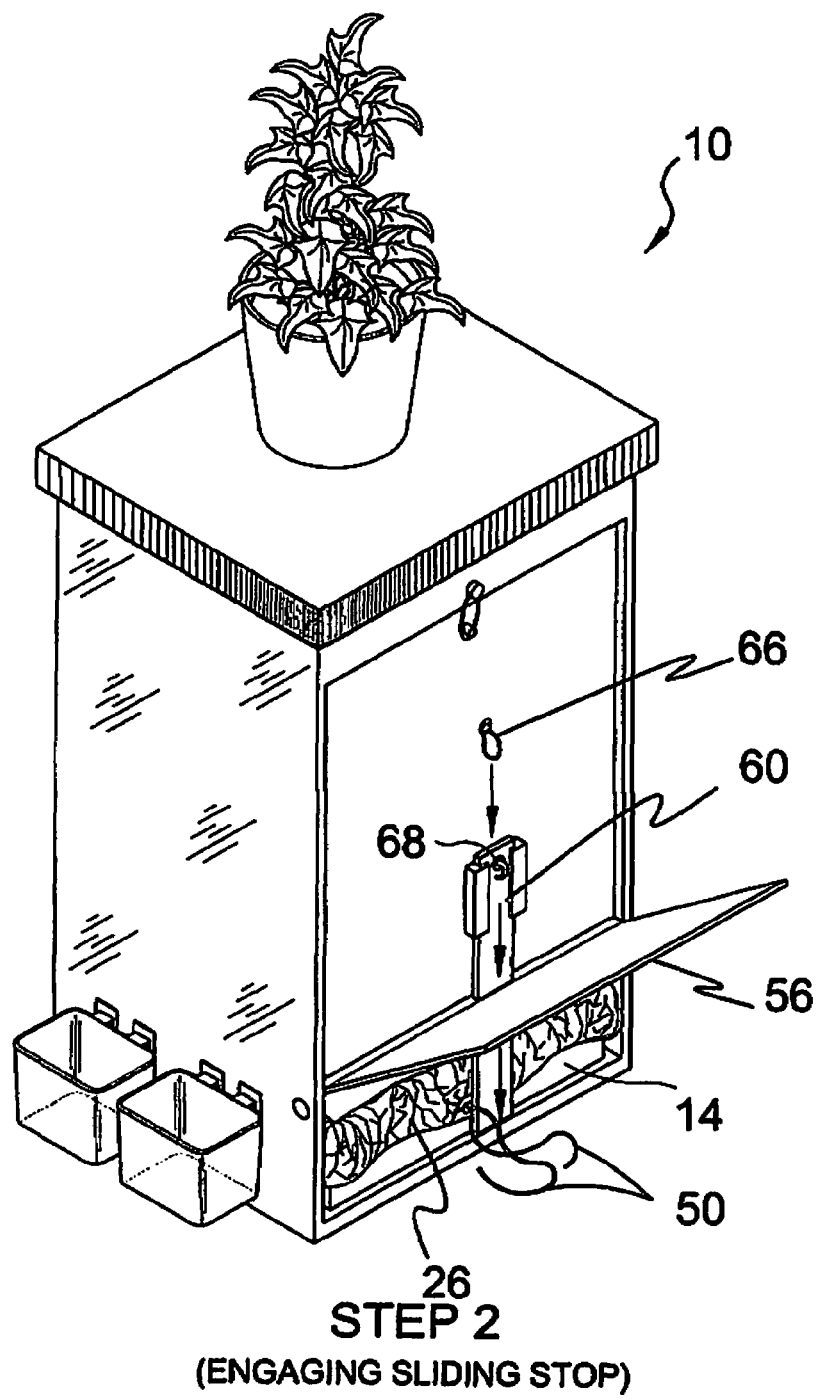
FIG. 15 is a perspective view of an additional embodiment of the present invention.

FIG. 15 is a perspective view of an additional embodiment of the present invention 10. Shown is the access door 56 in the up position, the stop catch 66 is released from the catch hook 68 and the sliding stop 60 is extended down through the stop aperture 64, preventing the litter box 14 from moving while the draw string 50 closes the liner 26.

Figure 16:
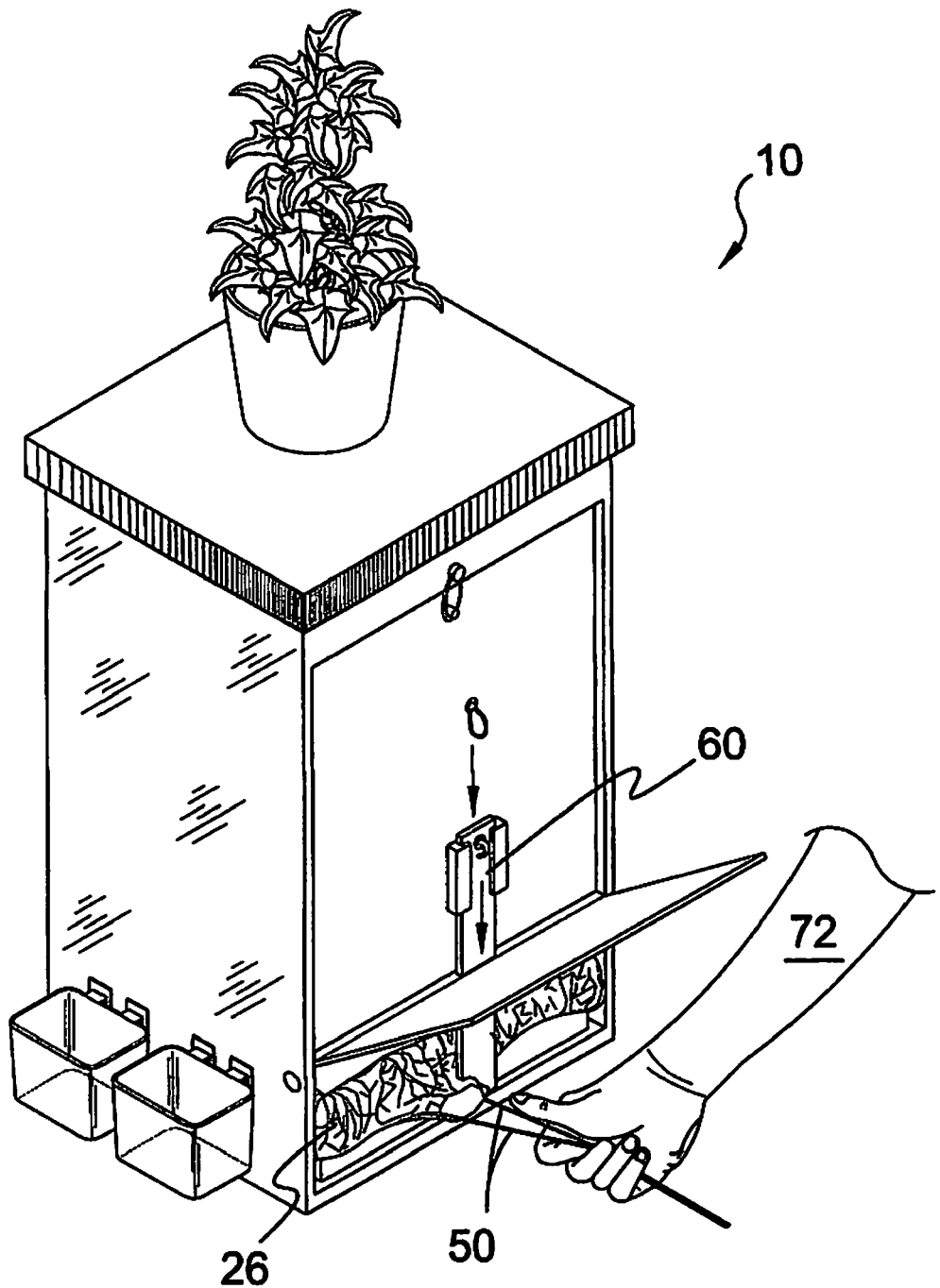
FIG. 16 is a perspective view of an additional embodiment of the present invention.

FIG. 16 is a perspective view of an additional embodiment of the present invention 10. Shown is the sliding stop 60 in the down position preventing the litter box 14 from moving while the draw string 50 is pulled by the user 72 closing the kitty litter bag 26.

Figure 17:
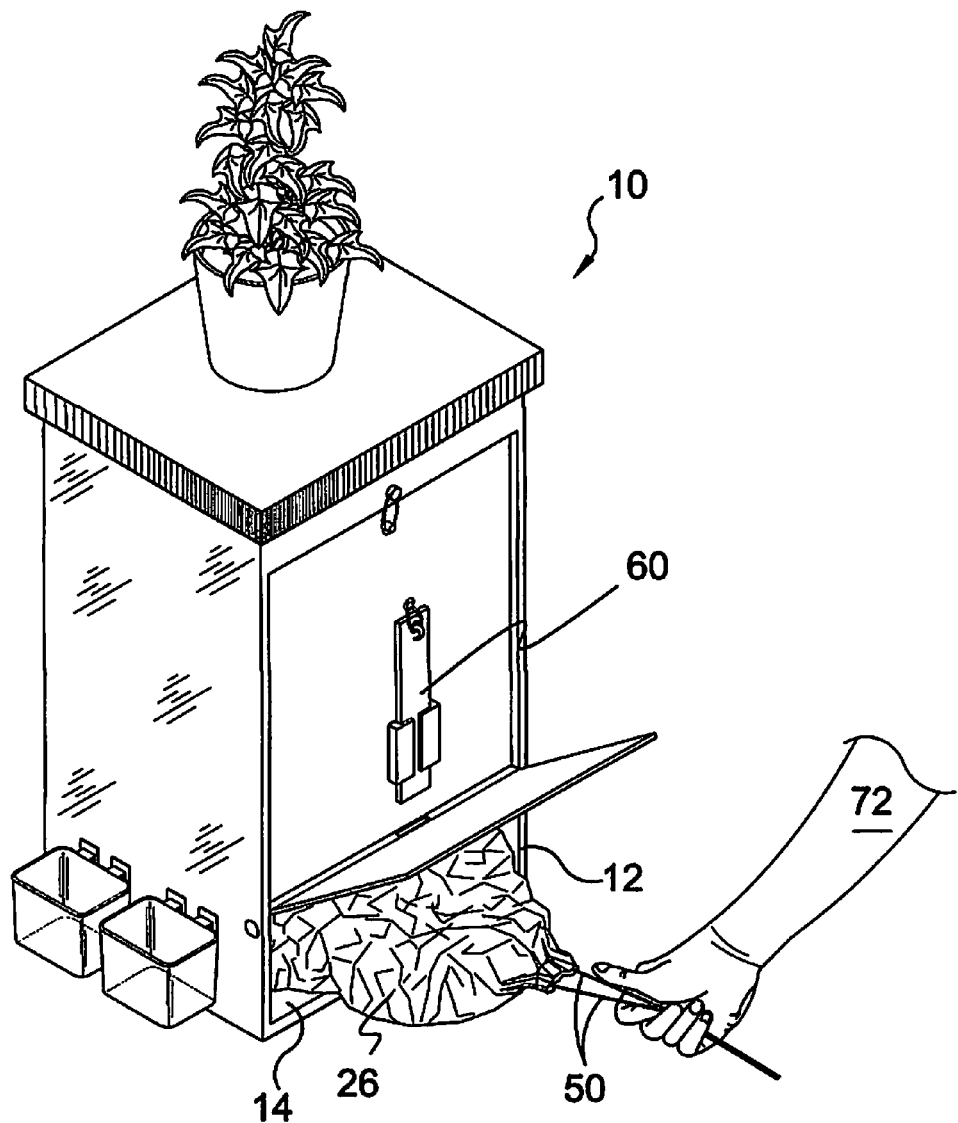
FIG. 17 is a perspective view of an additional embodiment of the present invention.

FIG. 17 is a perspective view of an additional embodiment of the present invention 10. Shown is the sliding stop 60 secured in the up position thereby removing the obstruction for removing the liner 26 from the litter box 14 and the housing 12. Shown is the user 72 pulling on the drawstrings 50 with the liner 26 partially removed from the litter box 14 and housing 12.

Figure 18:
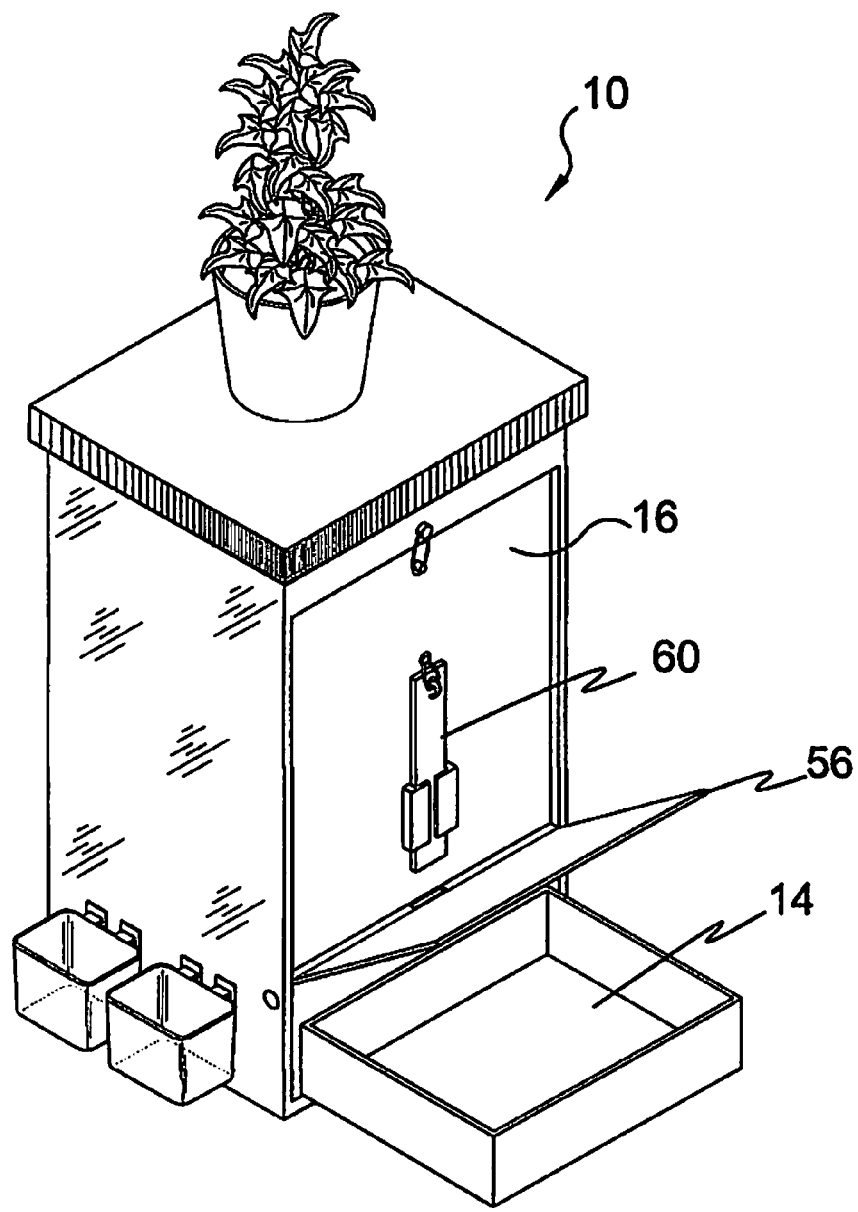
FIG. 18 is a perspective view of an additional embodiment of the present invention.

FIG. 18 is a perspective view of an additional embodiment of the present invention 10. Shown is the sliding stop 60 in the up and secured position and the empty litter tray 14 removed from the interior of the housing 12. A new litter bag is now ready to be inserted. When the litter bag is replaced, the unit is inserted back into the housing 12 and the access door 56 closed and the pivoting ramp 16 then lowered.

Figure 19:
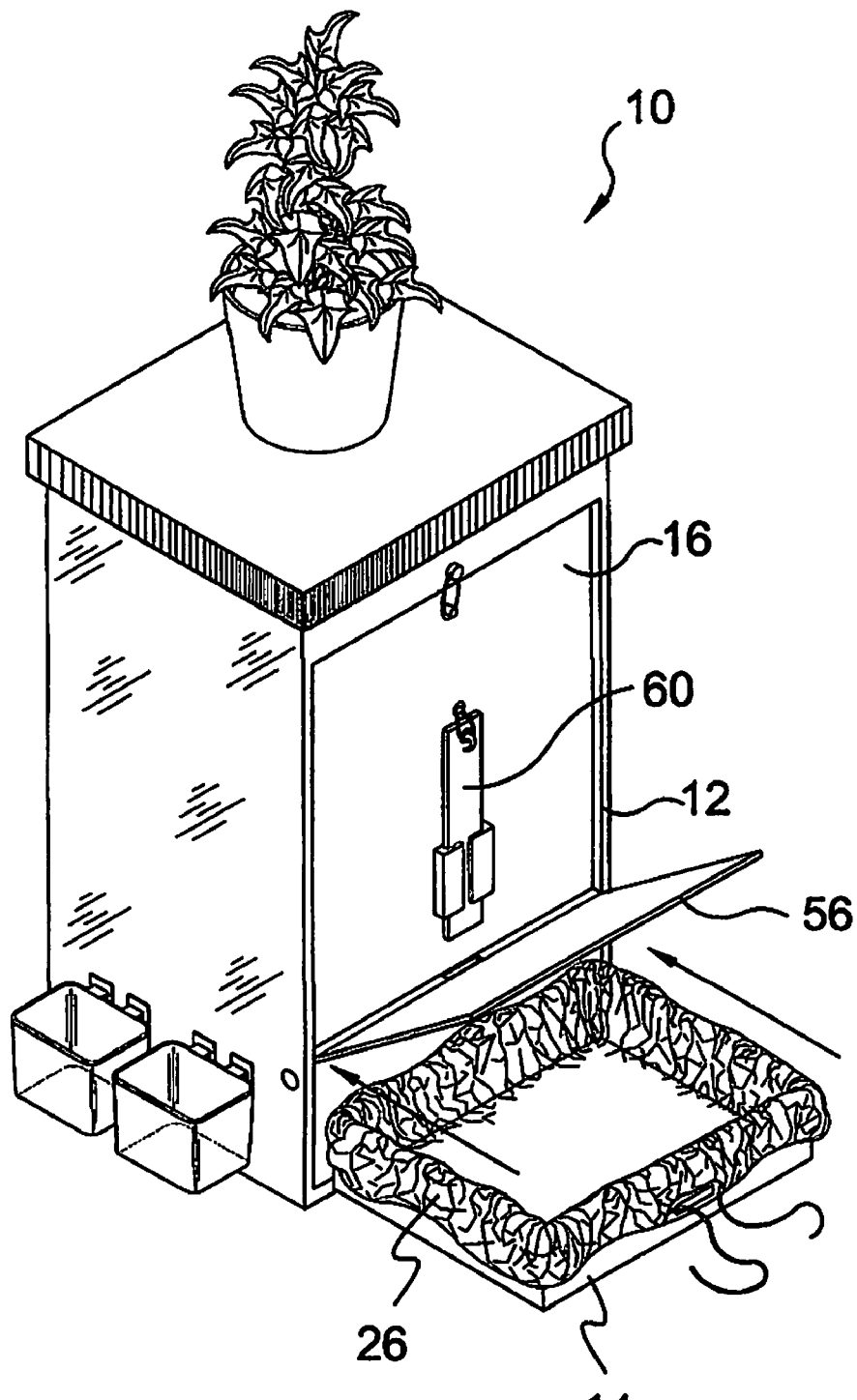
FIG. 19 is a perspective view of an additional embodiment of the present invention.

FIG. 19 is a perspective view of an additional embodiment of the present invention 10. Shown is the sliding stop 60 in the up and secured position and the litter tray 14 removed from the interior of the housing 12. A new litter bag 26 is now inserted. When the litter bag 26 is replaced, the litter box 14 is inserted back into the housing 12 and the access door 56 closed and the pivoting ramp 16 then lowered.

Figure 20:
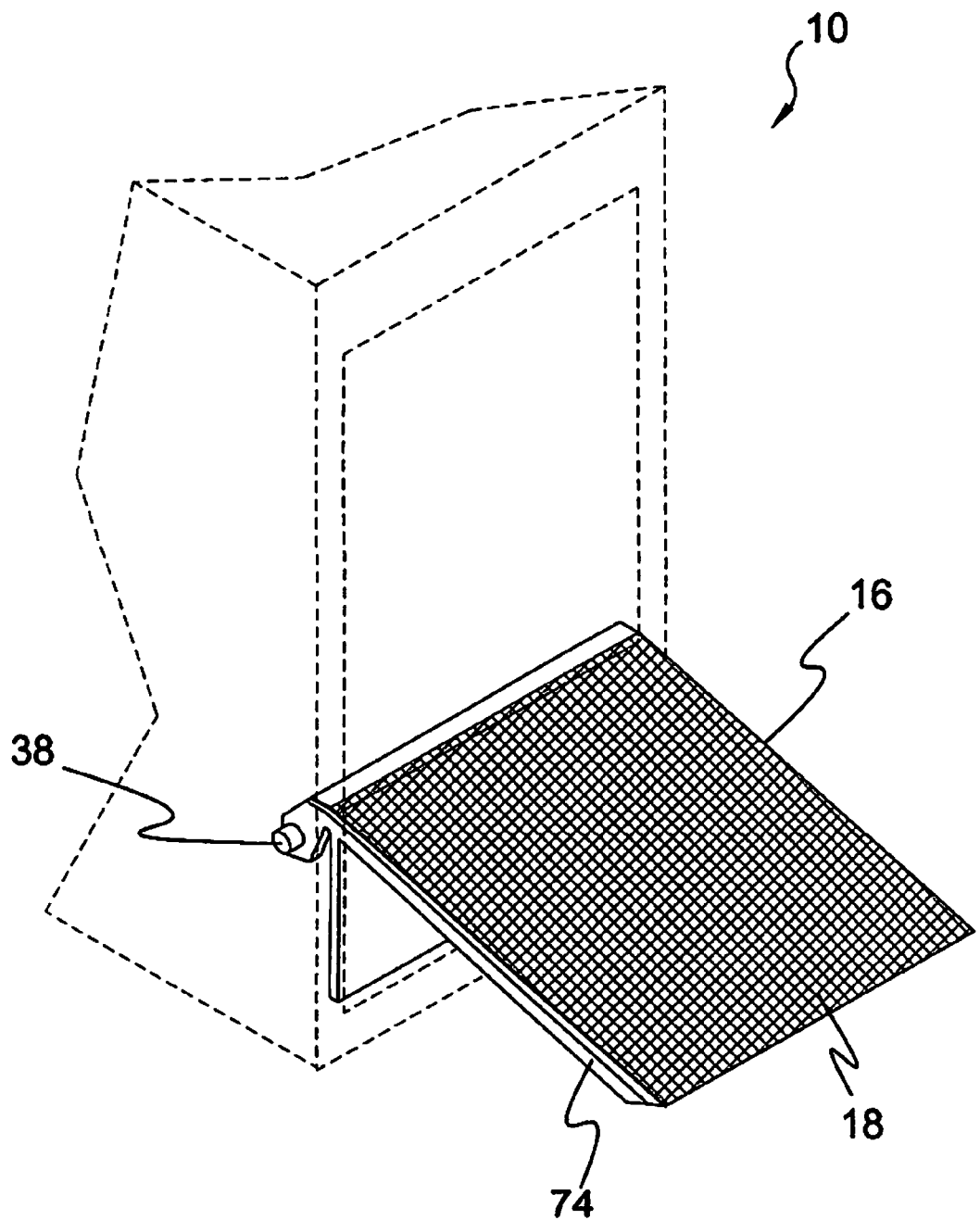
FIG. 20 is a detailed view of the pivoting ramp of the present invention.

FIG. 20 is a detailed view of the pivoting ramp 16 of the present invention 10. The pivoting ramp 16 allows access to the interior of the housing 12 and consists of a catch tray 74 having a mesh screen 18 covering the top portion and pivots on a hinge 38 from a down position to an up position. This catches any litter the cat may bring out from the litter tray upon its departure from the litter box. When the ramp 16 is lifted the litter in the catch tray 74 falls back down into the litter box. When the ramp 16 is in the up position it can be latched, allowing access to the litter box and plastic litter bag draw string.

Figure 21:
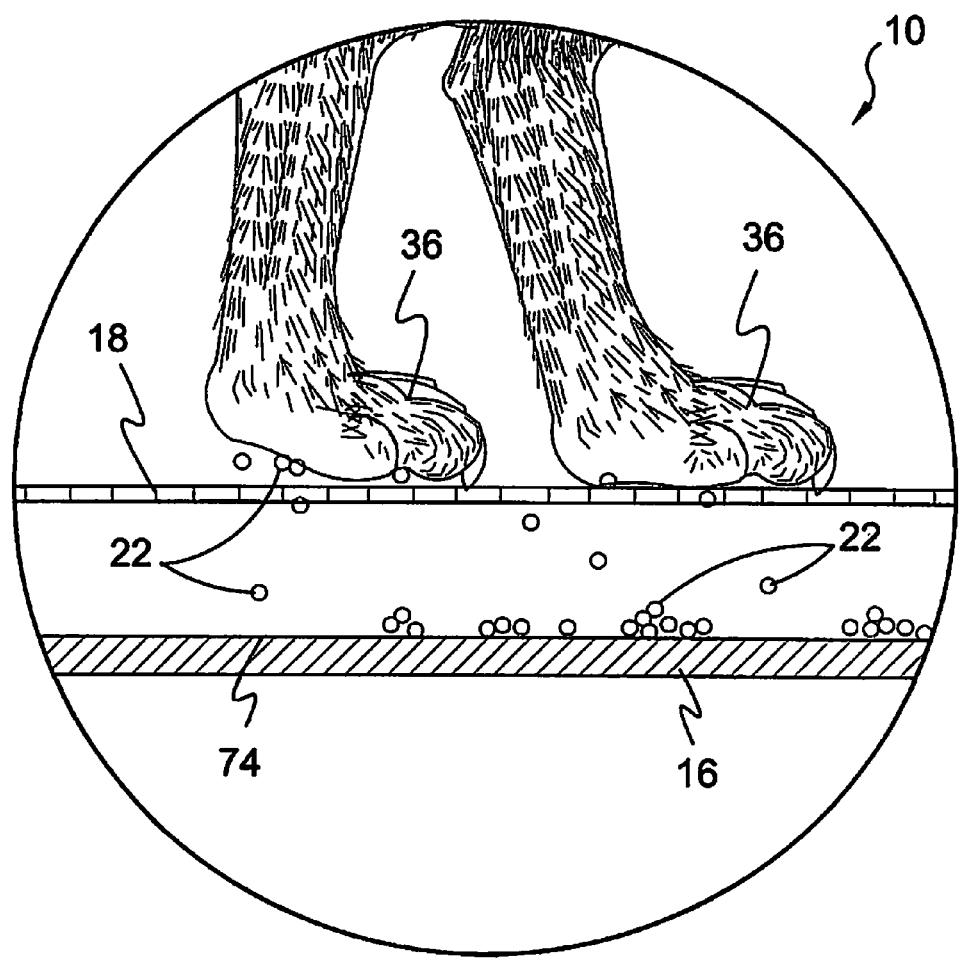
FIG. 21 is a detailed view of the pivoting ramp of the present invention.

FIG. 21 is a detailed view of the pivoting ramp 16 of the present invention 10. The pivoting ramp 16 allows access to the interior of the housing 12 and consists of a catch tray 74 having a mesh screen 18 covering the top portion and pivots from a down position to an up position. This catches any litter 22 clinging to the cats paws 36 may bring out from the litter tray upon its departure from the litter box. When the ramp 16 is lifted the litter 22 in the catch tray 74 falls back down into the litter box. When the ramp 16 is in the up position it can be latched, allowing access to the litter box and plastic litter bag draw string.

Figure 22:
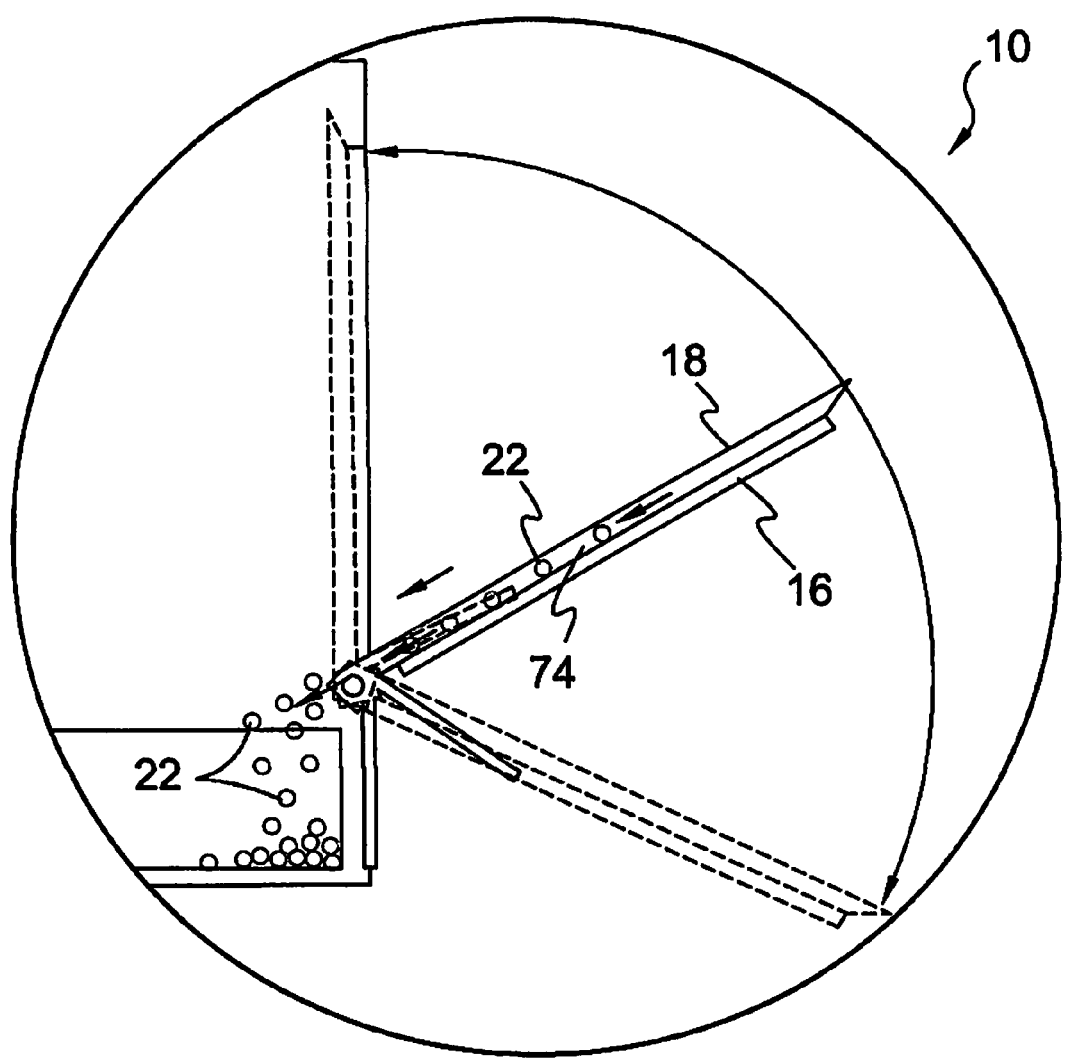
FIG. 22 is a detailed view of the pivoting ramp of the present invention.

FIG. 22 is a detailed view of the pivoting ramp 16 of the present invention 10. The pivoting ramp 16 consists of a catch tray 74 having a mesh screen 18 covering the top portion to catch any litter 22 the cat may bring out onto the litter tray upon its departure from the litter box. When the ramp 16 is lifted the litter 22 in the catch tray 74 falls back down into the litter box.

Figure 23:
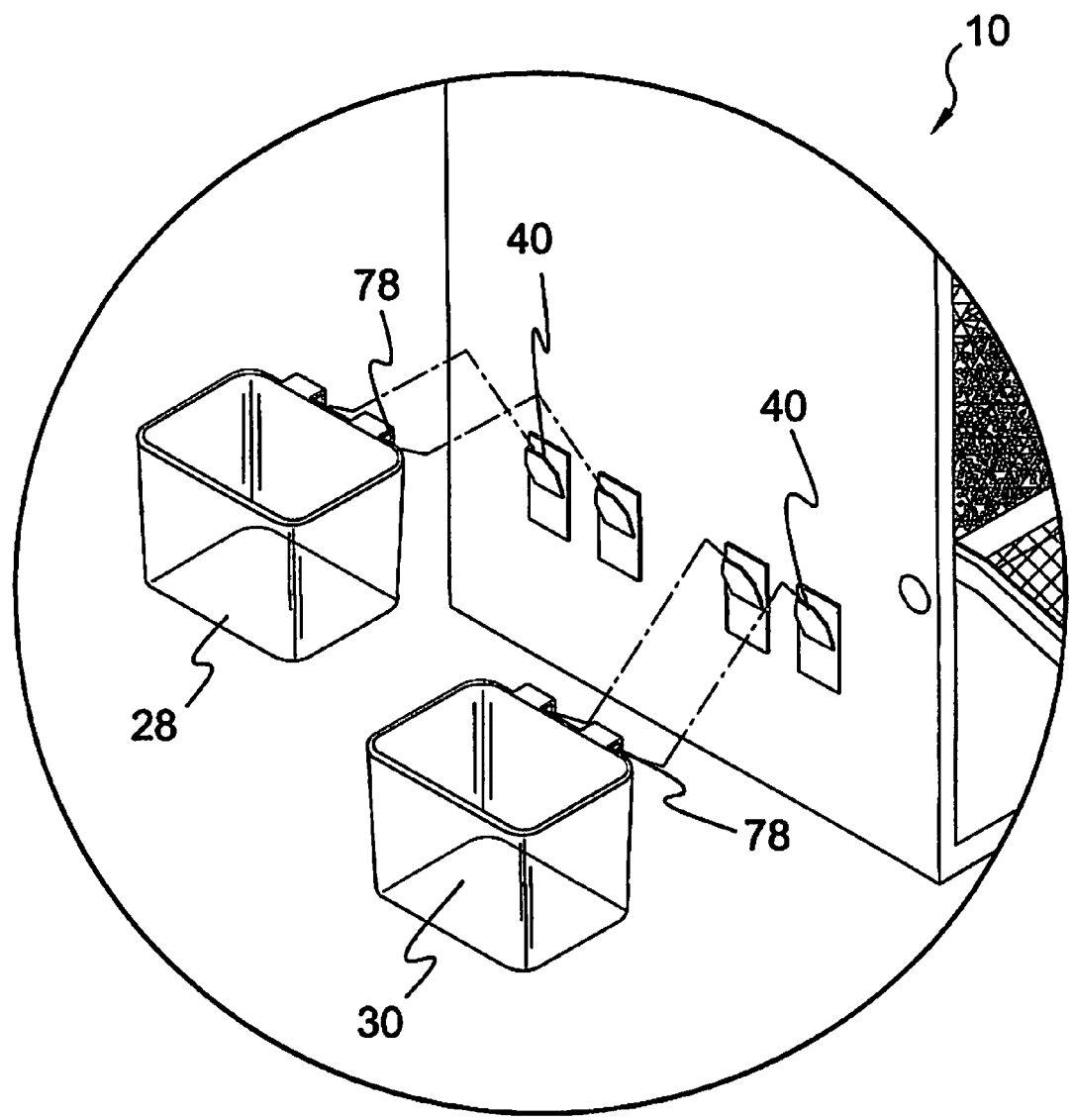
FIG. 23 is a detailed view of the food and water dish of the present invention.

FIG. 23 is a detailed view of the food dish 28 and water dish 30 of the present invention 10. Shown are the food 28 and water 30 dishes of the present invention 10 that are both removably attachable to accessory hooks 40 on the side wall of the housing 12 via attachment notches 78 disposed on the rear of the dishes.

Figure 24:
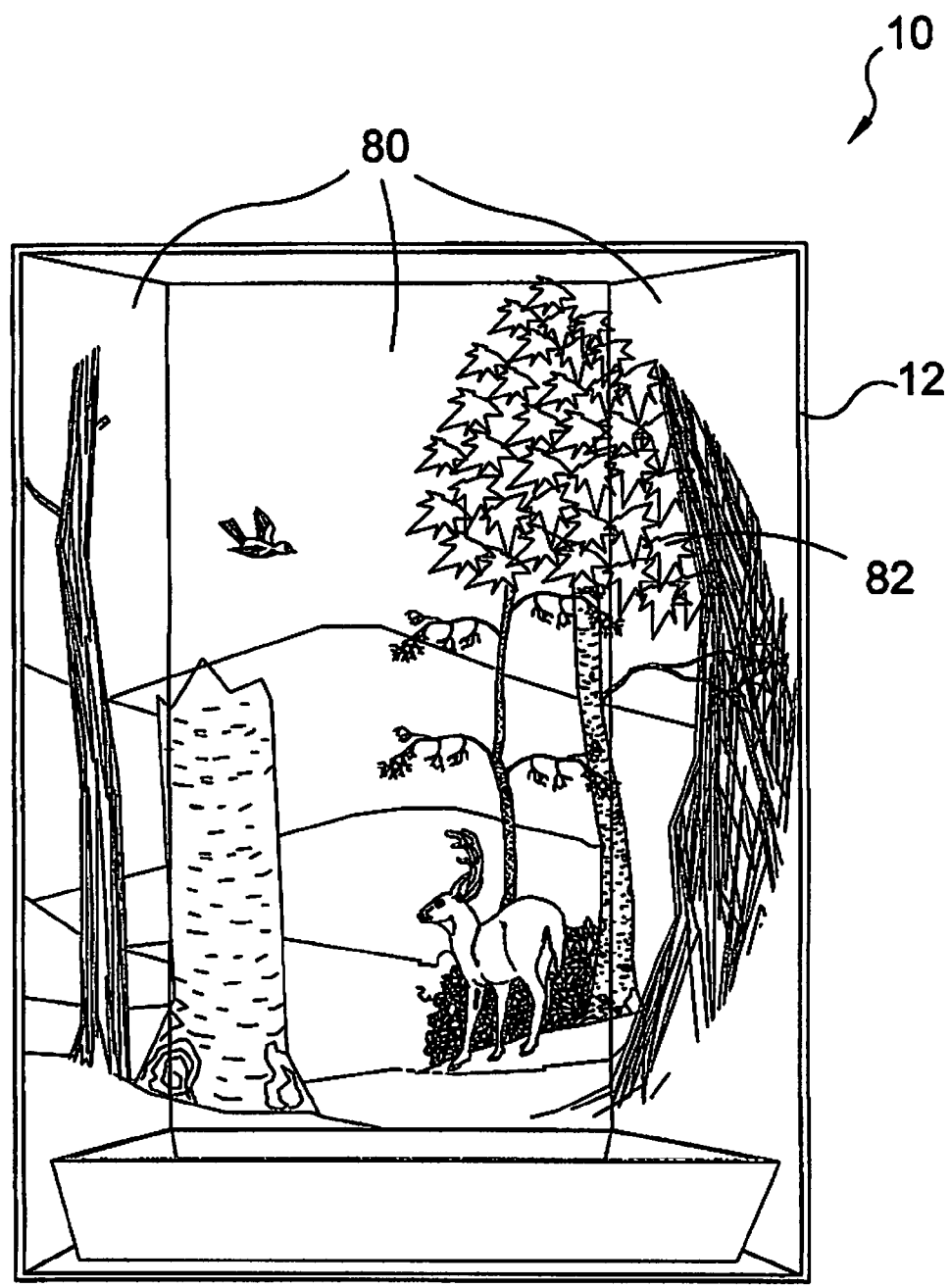
FIG. 24 is an interior view of the housing of the present invention.

FIG. 24 is an interior view of the housing 12 of the present invention 10. Shown are the interior walls 80 of the housing 12 having a scenic illustration 82 in bright colors on all three adjoining walls 80.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A decorative cat litter box enclosure having a furniture-like appearance comprising:
    a) a litter box housing having a substantially hollow interior;
    b) a substantially open front on said housing to provide a cat with access to said interior thereof;
    c) a pivoting ramp hingedly attached to sidewalls of said housing with said hinges disposed in a lower portion of said opening thereby subdividing it into a large superior opening for cat access and a smaller inferior opening, said ramp being sized to function as a door to cover said superior opening when pivoted and secured in a raised position;
    d) a litter box access door angularly integral with said ramp projecting from the edge affiliated with said hinge for covering said inferior opening when closed because said ramp is down and providing access to said litter box when opened because said ramp is up; and
    e) means to obstruct egress of said litter box when the user is preparing the liner of said litter box for removal therefrom.

2. The decorative cat litter box enclosure recited in claim 1, wherein said pivoting ramp further includes a means for extracting and storing residual litter from an exiting cats paws and later redepositing it in said litter box.

3. The decorative cat litter box enclosure recited in claim 2, wherein said litter extraction and storage means comprises:
    a) a catch tray forming the frame of said pivoting ramp having a bottom and three sidewalls extending perpendicularly from the edges therefrom with the edge oriented towards said hinge remaining open; and
    b) a mesh screen disposed on the top of said ramp in spaced apart relation to said bottom.

4. The decorative cat litter box enclosure recited in claim 3, wherein the distal edge of said bottom of said catch tray further includes a rubber edge to protect the surface on which the litter box enclosure is placed.

5. The decorative cat litter box enclosure recited in claim 3, wherein residual litter sticking to the bottom of a cats paw is brushed off by said mesh screen as the cat exits said housing via said ramp and the litter falls through said screen into said catch tray.

6. The decorative cat litter box enclosure recited in claim 5, wherein said residual litter is deposited into said litter box when the user pivots said ramp into the up position as it falls through the open end of said catch tray.

7. The decorative cat litter box enclosure recited in claim 6, wherein the user gains access to change the litter by lifting said ramp and securing it to said housing thereby simultaneously lifting said litter access door.

8. The decorative cat litter box enclosure recited in claim 7, wherein said ramp is secured in the up position by a latch mechanism disposed proximal the top exterior of said cat access opening and communicating with the distal edge of said ramp.

9. The decorative cat litter box enclosure recited in claim 8, wherein said means for obstructing the egress of said litter box is a stop assembly disposed on the underside of said ramp which, when in the raised position, appears to be on the front of said housing.

10. The decorative cat litter box enclosure recited in claim 9, wherein said stop assembly comprises:
    a) an elongate bar forming sliding stop;
    b) a stop retainer secured to said ramp surface that allows said sliding stop to reciprocate back and forth towards the distal end of said ramp and the hinged edge thereof while maintaining the alignment thereof;
    c) means for securing said sliding stop in a raised position relative to the ramp being in the raised position; and
    d) a stop aperture disposed in said access door adjacent to where it is adjoined to said ramp and aligned with said sliding stop.

11. The decorative cat litter box enclosure recited in claim 10, wherein said sliding stop securing means comprises a looped stop catch disposed on the ramp surface between said sliding stop and the distal edge of said ramp and a catch hook for receiving said stop catch for maintaining said stop in the raised position until released therefrom.

12. The decorative cat litter box enclosure recited in claim 11, wherein said stop is positioned for blocking said litter box by releasing stop catch from said stop hook and sliding said stop downward through said stop retainer and through said stop aperture until it sits on the bottom of said housing.

13. The decorative cat litter box enclosure recited in claim 12, wherein said litter box includes a liner.

14. The decorative cat litter box enclosure recited in claim 13, wherein said liner includes drawstrings.

15. The decorative cat litter box enclosure recited in claim 14, wherein said drawstrings are oriented towards said access door during installation.

16. The decorative cat litter box enclosure recited in claim 15, wherein the user initiates removal of said liner and contents when said stop is in the down position by pulling on said drawstrings to close said liner while said stop prevents the inadvertent movement of said litter box.

17. The decorative cat litter box enclosure recited in claim 16, wherein said stop is repositioned and secured to the raised position to facilitate the removal of said liner and its contents.

18. The decorative cat litter box enclosure recited in claim 17, wherein said litter box is disposable.

19. The decorative cat litter box enclosure recited in claim 18, wherein said liner is arranged so as to engulf said litter box when said drawstrings are pulled.

20. The decorative cat litter box enclosure recited in claim 19, wherein said litter box includes a plurality of support tabs projecting upward from the rear edge of said litter box to retain said liner in position while in use by a cat and said liner clears said support tabs when said drawstrings are pulled by the user to engulf said litter box and said litter therein for removal and replacement.

21. The decorative cat litter box enclosure recited in claim 17, wherein said liner is arranged on the inside and over the edges of said litter box and said litter is disposed therein.

22. The decorative cat litter box enclosure recited in claim 21, wherein said liner and litter are removed by the user and replaced in the same reusable litter box.

23. The decorative cat litter box enclosure recited in claim 1, wherein the sidewalls of said housing include a plurality of accessory hooks for hanging assorted items thereon.

24. The decorative cat litter box enclosure recited in claim 23, wherein a plurality of hooks are disposed toward the bottom of one sidewall of said housing to receive a food dish and a water dish.

25. The decorative cat litter box enclosure recited in claim 1, further including a decorative scene disposed on the interior walls of said housing.

26. The decorative cat litter box enclosure recited in claim 1, wherein said housing is capable of supporting decorative items placed atop of said housing.

27. The decorative cat litter box enclosure recited in claim 1, further including a split privacy curtain disposed at the entrance of said housing.

* * * * *